(12) United States Patent
Mushika et al.

(10) Patent No.: US 7,635,939 B2
(45) Date of Patent: Dec. 22, 2009

(54) MICROACTUATOR WITH DISPLACEMENT SENSING FUNCTION AND DEFORMABLE MIRROR INCLUDING THE MICROACTUATOR

(75) Inventors: Yoshihiro Mushika, Neyagawa (JP); Yoshihiro Kanda, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/050,478

(22) Filed: Mar. 18, 2008

(65) Prior Publication Data
US 2008/0231141 A1    Sep. 25, 2008

Related U.S. Application Data

(62) Division of application No. 10/530,604, filed as application No. PCT/JP2003/014125 on Nov. 5, 2003, now Pat. No. 7,368,846.

(30) Foreign Application Priority Data

Jun. 11, 2002  (JP) ............................. 2002-322247
Oct. 10, 2003  (JP) ............................. 2003-352736

(51) Int. Cl.
*G02B 26/08* (2006.01)

(52) U.S. Cl. ...................... 310/309; 318/116; 359/291; 359/224

(58) Field of Classification Search ................ 309/309; 359/290, 291, 223.1, 224.1, 225.1, 226.1, 359/226.2; 318/116
See application file for complete search history.

(56) References Cited

U.S. PATENT DOCUMENTS

| 4,737,621 | A |   | 4/1988 | Gonsiorowski et al. |
| 5,079,544 | A |   | 1/1992 | DeMond et al. |
| 5,534,740 | A | * | 7/1996 | Higuchi et al. ............... 310/309 |
| 6,057,913 | A |   | 5/2000 | Brown et al. |
| 6,178,069 | B1 |   | 1/2001 | Suzuki |
| 6,185,167 | B1 |   | 2/2001 | Arai et al. |
| 6,206,290 | B1 |   | 3/2001 | Giebel et al. |

(Continued)

FOREIGN PATENT DOCUMENTS

EP    0790604 A2    8/1997

(Continued)

OTHER PUBLICATIONS

Tadashi Aruga, "Application of Adaptive Optics to Communication and Sensing"; The Journal of Institute of Electronics, Information and Communication Engineers; vol. 80, No. 12; pp. 1237-1241, (1997).

(Continued)

*Primary Examiner*—Karl I Tamai
(74) *Attorney, Agent, or Firm*—Panitch Schwarze Belisario & Nadel LLP

(57) ABSTRACT

According to the present invention, a moving element such as an electrostatically driven actuator is displaced by supplying a drive signal thereto. Meanwhile, a displacement sensing section senses its displacement and a calibrating section automatically calibrates the correlation between the drive signal and the displacement, thereby compensating for a variation in the characteristic of the actuator with time and according to the environment. A switching section selectively connects the single displacement sensing section to a plurality of moving elements one after another, thereby cutting down the circuit for displacement sensing.

9 Claims, 14 Drawing Sheets

U.S. PATENT DOCUMENTS

| | | | |
|---|---|---|---|
| 6,220,707 B1 | 4/2001 | Bille | |
| 6,411,576 B1 | 6/2002 | Furukawa et al. | |
| 6,430,137 B1 | 8/2002 | Saimi et al. | |
| 6,538,802 B2 | 3/2003 | Wang et al. | |
| 6,708,082 B2 | 3/2004 | Oettinger et al. | |
| 6,711,314 B1 | 3/2004 | Mori et al. | |
| 6,798,992 B1 | 9/2004 | Bishop et al. | |
| 6,952,304 B2* | 10/2005 | Mushika et al. | 359/295 |
| 7,068,415 B2 | 6/2006 | Mushika | |
| 7,081,647 B2 | 7/2006 | Mushika | |
| 7,088,492 B2 | 8/2006 | Yanagita et al. | |
| 7,122,786 B2 | 10/2006 | Tochio et al. | |
| 7,208,857 B2 | 4/2007 | Fasen | |
| 7,245,363 B2 | 7/2007 | Mushika | |
| 7,368,846 B2* | 5/2008 | Mushika et al. | 310/309 |
| 2002/0061917 A1 | 5/2002 | Li et al. | |
| 2004/0047548 A1 | 3/2004 | Okumura et al. | |
| 2005/0063285 A1 | 3/2005 | Mushika et al. | |
| 2006/0109538 A1* | 5/2006 | Mushika et al. | 359/291 |
| 2008/0231141 A1* | 9/2008 | Mushika et al. | 310/309 |

FOREIGN PATENT DOCUMENTS

| | | |
|---|---|---|
| JP | 01-253841 A | 10/1989 |
| JP | 05-260766 A | 10/1993 |
| JP | 07-084196 A | 3/1995 |
| JP | 09-159939 A | 6/1997 |
| JP | 09-237425 A | 9/1997 |
| JP | 10-222856 A | 8/1998 |
| JP | 10-289468 A | 10/1998 |
| JP | 11-014918 A | 1/1999 |
| JP | 11-231234 A | 8/1999 |
| JP | 11-305159 A | 11/1999 |
| JP | 2000-182268 A | 6/2000 |
| JP | 2000-235715 A | 8/2000 |
| JP | 2001-174723 A | 6/2001 |
| JP | 2002-236263 A | 8/2002 |
| JP | 2002-236264 A | 8/2002 |
| JP | 2003-029171 A | 1/2003 |
| JP | 2003-185949 A | 7/2003 |
| JP | 2004-048187 A | 2/2004 |

OTHER PUBLICATIONS

Krishnamoorthy Mali R. et al.; "Development of microelectromechanical deformable mirrors for phase modulation of light"; Optical Engineering; vol. 36, No. 2; pp. 542-548, (1997).

Hornebeck; "Digital Light Processing for High-Brigtness, High-Resolution Applications"; pp. 1-14.

Thor Juneau et al.; "Dual Axis Operation of a Micromachined Rate Gyroscope" Transducers; pp. 883-886, (1997).

Bishnu P. Gogoi et al.; "Force Balanced Micromachined Pressure Sensors"; IEEE Transactions on Electron Devcies; vol. 48, No. 8; pp. 1575-1584; (2001).

Selden B. Crary et al.; "Digital Compensation of High-performance Silicon Pressure Transducers"; Sensors and Actuators; pp. 70-72; (1990).

Julie A. Perreault et al.; "Adaptive optic correction using microelectromechanical deformable mirrors"; Optical Engineering; vol. 41, No. 3; pp. 561-566; (2002).

R.W. Corrigan et al.; "Grating Light Valve Technology for Protection Displays"; Presented in the International display Workshop, Kobe, Japan; Paper No. LAD5-1; (1998).

* cited by examiner

FIG.11
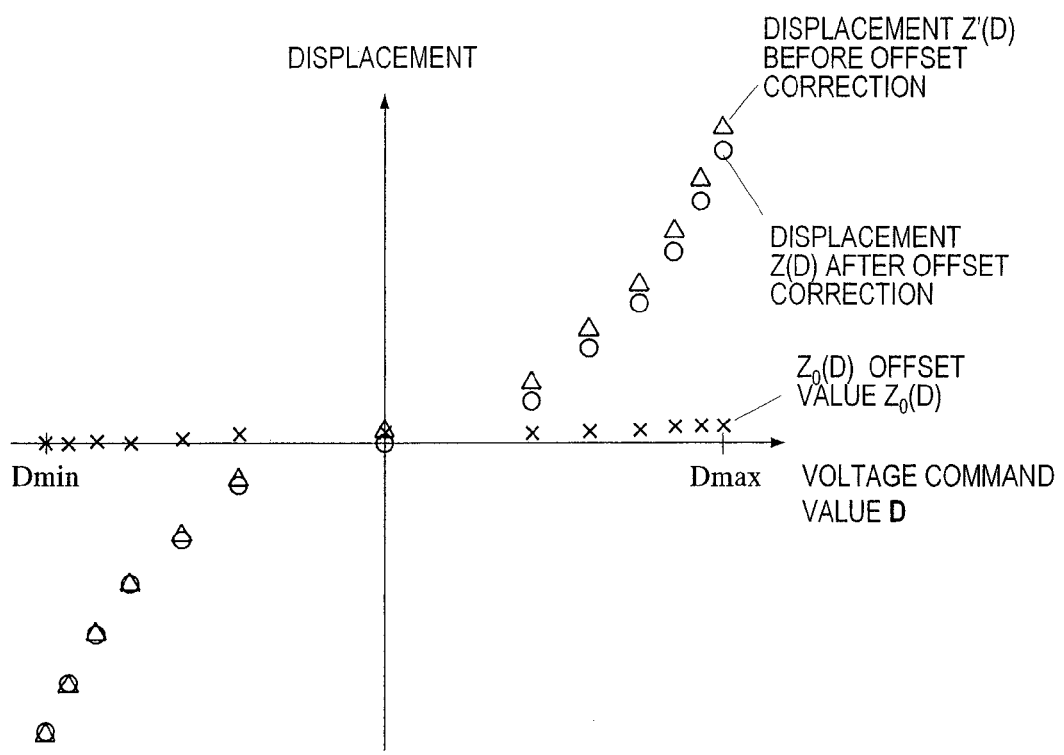
(a)
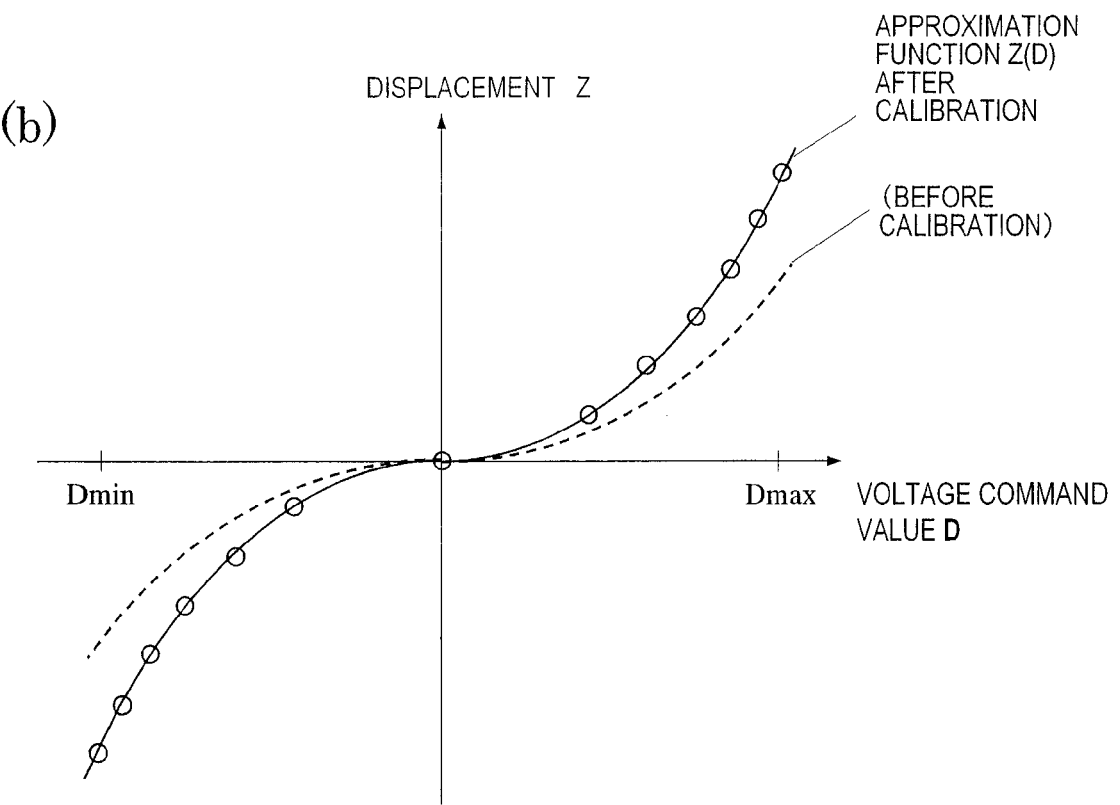
(b)

FIG.14
(a)
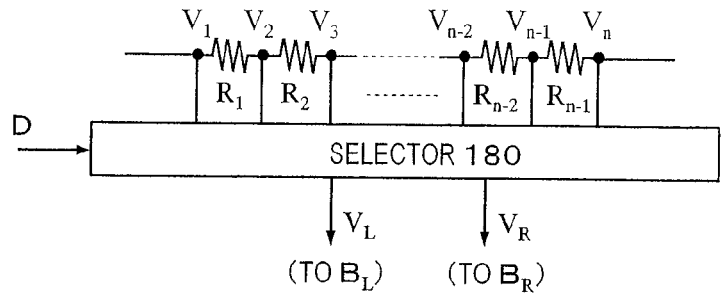
(b)
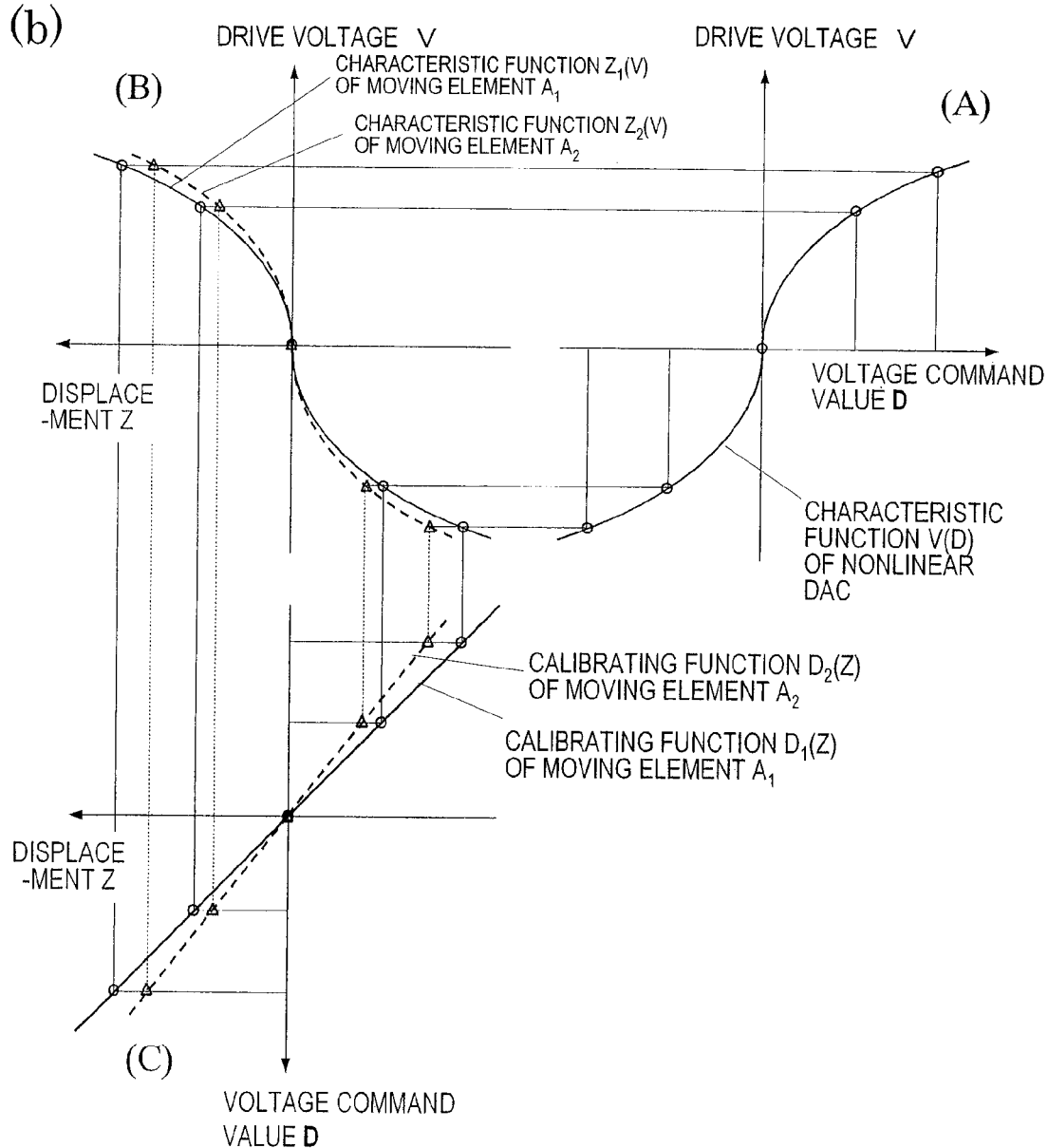

MICROACTUATOR WITH DISPLACEMENT SENSING FUNCTION AND DEFORMABLE MIRROR INCLUDING THE MICROACTUATOR

CROSS-REFERENCE TO RELATED APPLICATIONS

This application is a divisional of co-pending U.S. application Ser. No. 10/530,604 filed Apr. 7, 2005, which is a section 371 of International Application No. PCT/JP2003/014125, filed Nov. 5, 2003, which was published in the Japanese language on May 21, 2005, under International Publication No. WO2004/041710 A1 and the disclosure of which is incorporated herein by reference.

BACKGROUND OF THE INVENTION

The present invention relates to a microactuator with a displacement sensing function and a deformable mirror including such a microactuator. The present invention also relates to various systems including such a microactuator.

BRIEF SUMMARY OF THE INVENTION

Various types of microactuators have been developed by microelectromechanical system (MEMS) technologies that use semiconductor processing. According to the MEMS technologies, a lot of actuators, driver circuits and so on can be made at the same time. Thus, their applications have been broadened so as to make full use of their advantageous features. A deformable mirror, which is an arrangement of a huge number of micromirrors on a substrate, is one of those applications. The deformable mirror has found applications in compensating optical systems, displays, optical communications and other apparatuses to actively correct the wave front aberration of light.

The following two methods are known as conventional methods of controlling the magnitude of displacement of a deformable mirror.

One method is an open loop control in which the displacement of the mirror is controlled with drive voltages applied in multiple stages (see R. W. Corrigan, D. T. Amm and C. S. Gudeman, "Grating Light Valve™ Technology for Projection Displays", presented at the International Display Workshop, Kobe Japan, Dec. 9, 1998, Paper Number LAD 5-1, for example). In this document, the deformable mirror is used as a diffraction grating for controlling the amount of diffracted light with the magnitude of displacement of the mirror, which is subjected to an open loop control in multiple stages. This document also discloses the technique of correcting a variation in characteristic among a plurality of deformable mirrors by empirically tracing the relationship between the drive voltage and the amount of diffracted light at several points in advance during a manufacturing process and by compiling a conversion table with those relationships interpolated.

The other method is a closed loop control using an external sensor. In a compensating optical system, for example, a control signal for a deformable mirror is generated based on an error signal that has been detected with a wavefront sensor, thereby performing a closed loop control (see J. A. Perreault, T. G. Bifano et al., "Adaptive Optic Correction Using Microelectromechanical Deformable Mirrors", Optical Engineering, Vol. 41, No. 3, pp. 561-566 (March, 2002), for example).

In the field of microsensors, the following technologies are known. Some pressure sensors sense the deformation of a diaphragm under an external pressure as a variation in electrostatic capacitance (see S. B. Crary, W. G. Baer et al., "Digital Compensation of High-Performance Silicon Pressure Transducers", Sensors and Actuators, A21 to A23, pp. 70-72 (1990), for example). This document discloses a configuration in which relationships between the pressure and the sensor output are traced empirically in advance under multiple temperature conditions and in which a calibration polynomial, approximating these relationships, is stored in a memory.

There is also a force balanced pressure sensor, which makes another electrode produce electrostatic force to offset external pressure, performs a control so as to reduce the deformation of the diaphragm to substantially zero, and calculates the external pressure based on the magnitude of that electrostatic force (see B. P. Gogoi, C. C. Wang and C. H. Mastrangelo, "Force Balanced Micromachined Pressure Sensors", IEEE Transactions on Electron Devices, Vol. 48, No. 8, pp. 1575-1584 (August 2001), for example).

Some angular velocity sensors sense the magnitude of displacement of a movable body due to the Coriolis force produced by an external angular velocity as a variation in electrostatic capacitance (see T. Juneau, A. P. Pisano and J. H. Smith, "Dual Axis Operation of a Micromachined Rate Gyroscope", Transducers '97, 1997 International Conference on Solid-State Sensors and Actuators, Chicago, June 16-19, pp. 883-886). This document discloses a configuration for correcting the drift of a zero point due to the initial positional error of a movable body.

These microactuators, however, have the following drawbacks.

As for the microactuator for performing an open loop control by compiling a conversion table during the manufacturing process, it is troublesome to collect data to make the conversion table and the microactuator can cope with a variation with time or according to the environment only within a certain limit. For example, to trace a relationship between the drive voltage and the amount of diffracted light, the amount of light needs to be measured pixel by pixel by actually irradiating the microactuator with external light. Thus, a dedicated measuring device is needed and a lot of preparatory work, such as positioning the beam spot accurately, must be done. Consequently, it is very troublesome to collect the data required. Also, only the characteristic of the microactuator during the initial stage of the manufacturing process can be evaluated and the magnitude of displacement of the moving section cannot be monitored once the microactuator has been built in an apparatus actually. For that reason, even if the characteristic of the actuator has changed due to either a variation with time or a variation according to the environment (e.g., the temperature variation), corrections cannot be made appropriately so as to cope with such a change.

The microactuator for performing a closed loop control using an external sensor such as a wavefront sensor requires, first of all, an expensive control system. To carry out a closed loop control with good stability, the number of sensing points of the wavefront sensor needs to be greater than the number of actuators included in the deformable mirror. In a Shack-Hartmann type wavefront sensor, for example, it is generally believed that the number of sensing points needs to be at least twice as large as that of actuators. Accordingly, a sensor with relatively high resolution is needed to carry out the closed loop control. In addition, positioning adjustment has to be done so as to associate each sensing point of the wavefront sensor with a driving point of the deformable mirror precisely enough. Furthermore, a relatively high-precision and large-scale controller is needed to perform computations (such as wavefront reconstitution) on a plurality of sensing signals and generate control signals for respective driving points. Secondly, in that microactuator, a significant amount of light is lost by the wavefront sensor. The wavefront sensor senses the wavefront by using a portion of a bundle of rays, of which the wavefront should be corrected, thus leading to the loss of the amount of light. If the number of sensing points on the wavefront is increased for the purpose of the closed loop control and if the sensor needs to guarantee prescribed sensitivity (i.e., S/N ratio) for each sensing point, then the wavefront sensor causes a significant loss in the amount of light.

Furthermore, the microsensor such a pressure sensor or an angular velocity sensor has the following structural features and accompanying problems. First of all, the microsensor described in the document mentioned above senses and controls the displacement of just one movable body. However, if a plurality of actuators needs to be driven at the same time as in a deformable mirror, for example, and if the microsensor performs the closed loop control on each of those actuators, then the circuit size becomes extremely big for that purpose. That is to say, the same number of sensing signal generators, amplifiers, A/D converters, controllers and other circuits as that of the actuators are needed for the purpose of displacement sensing. Particularly when there are a huge number of actuators, the circuit scale increases tremendously and the overall chip cost rises significantly.

A second problem is that no configuration for tracing the relationship between the drive signal and the displacement and self-calibrating it is disclosed in that document. Thus, it is difficult to apply the conventional technique to increasing the displacement precision of the actuators. Both the pressure sensor and the angular velocity sensor include a movable body, which is displaced under externally applied force, and a structure for converting the displacement of this movable body into a sensor output. However, the correspondence pre-stored in a memory is used during this converting operation, and the correlation between the displacement of the movable body and the output is fixed except the zero point drift correction. The zero point drift correction is done to correct the offset while the movable body has not been displaced at all, and has essentially nothing to do with the relationship between the drive signal and the displacement. Accordingly, even if some mechanical property has varied with time (e.g., a spring constant has varied due to repetitive fatigue), that variation is not correctible.

That is to say, a configuration for self-calibrating the relationship between a drive signal for an actuator and the displacement thereof while displacing the actuator is disclosed in none of the documents cited above. Thus, it is difficult in the prior art to compensate for the actuator characteristic, which varies either with time or due to any of various environmental factors, in a broad displacement range.

In order to overcome the problems described above, an object of the present invention is to provide a microactuator and a deformable mirror, which realize high-reliability positioning adjustment with a simple configuration and with a variation in characteristic with time or according to the environment corrected.

A microactuator according to the present invention includes: a substrate; a moving element, which is supported on the substrate in a displaceable position; a driving section for outputting a drive signal that causes displacement in the moving element; a converting section, which stores a correlation between the displacement of the moving element and the drive signal; a displacement sensing section for sensing the displacement of the moving element being supplied with the drive signal; and a calibrating section for calibrating the correlation stored in the converting section with the drive signal and the output of the displacement sensing section.

In one preferred embodiment, the moving element includes a fixed electrode, which is fixed on the substrate, and a movable electrode, which faces the fixed electrode, and the displacement sensing section senses the displacement of the moving element by a variation in electrostatic capacitance produced between the fixed electrode and the movable electrode.

In another preferred embodiment, the driving section outputs, as the drive signal, a low-frequency signal, of which the frequency is approximately equal to, or lower than, the primary resonance frequency of the moving element. And the displacement sensing section superposes, on the drive signal, a high-frequency signal, of which the frequency is equal to or higher than the primary resonance frequency of the moving element.

In another preferred embodiment, the driving section outputs a substantial DC voltage as the drive signal.

In another preferred embodiment, the DC voltage output by the driving section as the drive signal has multiple stages. The displacement sensing section senses the displacement of the moving element in each of the multiple stages. And the calibrating section approximates the DC voltage in each said stage and the output of the displacement sensing section with an approximation function of a predetermined form.

In another preferred embodiment, the driving section outputs, as the drive signal, a low-frequency signal having multiple stages of frequencies. The displacement sensing section senses the displacement of the moving element in which vibration has been produced. And the calibrating section calculates the amplitude response or phase response of the moving element by correlating the drive signal and the output of the displacement sensing section with each other.

In another preferred embodiment, the driving section outputs, as the drive signal, a low-frequency signal, of which the frequency is approximately equal to the primary resonance frequency of the moving element, in multiple stages. The displacement sensing section senses the displacement of the moving element in which vibration has been produced in each of the multiple stages. And the calibrating section extracts the primary resonance frequency of the moving element by correlating the drive signal and the output of the displacement sensing section with each other.

In another preferred embodiment, if the amplitude of the drive signal is defined high, the amplitude of the high-frequency signal, generated by the displacement sensing section, is defined low.

In another preferred embodiment, the movable electrode of the moving element includes a first conductive portion and a second conductive portion, which are arranged substantially symmetrically to each other with respect to a predetermined axis, and is supported so as to tilt freely around the axis. The fixed electrode includes a first electrode, which faces the first conductive portion of the movable electrode with a gap, and a second electrode, which faces the second conductive portion of the movable electrode with a gap. The driving section supplies the drive signal to either between the first conductive portion and the first electrode or between the second conductive portion and the second electrode. The displacement sensing section applies a first high-frequency signal to the first electrode and a second high-frequency signal, which has the same amplitude as, but an inverse phase to, the first high-frequency signal, to the second electrode, respectively, thereby detecting a voltage at a terminal where the first and second conductive portions are electrically connected together.

In another preferred embodiment, the converting section generates a voltage command value, which is associated with the displacement of the moving element. The driving section includes a D/A converter for outputting the drive signal that has been controlled in accordance with the voltage command value. And the calibrating section calibrates a correlation between the voltage command value and the displacement of the moving element.

In another preferred embodiment, the D/A converter has a nonlinear characteristic and the larger the value of the drive signal, the smaller the increase of the drive signal corresponding to that of the voltage command value.

In another preferred embodiment, the calibrating section approximates a correlation between the voltage command value and the displacement of the moving element with a linear function.

In another preferred embodiment, the calibrating section is activated when the microactuator is turned on.

In another preferred embodiment, the microactuator includes a temperature sensing section. The calibrating section is activated when the temperature sensing section has sensed a temperature variation that is at least equal to a predetermined value.

In another preferred embodiment, the microactuator includes an abnormality detecting section for detecting an abnormality in the moving element or the displacement sensing section when the output of the displacement sensing section is beyond a predefined range.

In another preferred embodiment, if the abnormality detecting section has detected any abnormality, the calibrating section is prohibited from updating the correlation.

Another microactuator according to the present invention includes: a substrate; a plurality of moving elements, which are supported on the substrate in a displaceable position; a driving section for outputting a drive signal that causes displacement in the moving elements; a displacement sensing section for sensing the displacement of the moving elements; and a switching section for selectively connecting the driving section and/or the displacement sensing section to one of the moving elements after another.

In one preferred embodiment, the switching section senses the displacement of each said moving element while switching time-sequentially objects of the displacement sensing by the displacement sensing section.

In another preferred embodiment, the microactuator includes a closed loop control section for performing a closed loop control on the output of the driving section with the output of the displacement sensing section.

In another preferred embodiment, the microactuator further includes an open loop control section for performing an open loop control on the output of the driving section and controls the moving elements by switching the closed loop control section and the open loop control section time-sequentially.

In another preferred embodiment, the open loop control section includes a holding section for holding the output of the driving section that is under the control of the closed loop control section.

In another preferred embodiment, the moving elements are provided so as to store charges in accordance with the drive signal. The switching section switches the moving elements between a first state, in which the moving elements are connected to the closed loop control section, and a second state, in which the moving elements have impedance that is high enough to store the charges.

In another preferred embodiment, the microactuator includes a counter for calculating a value representing the amount of time in which each said moving element is connected to the closed loop control section and a convergence detecting section for detecting the convergence of the closed loop control. Unless the convergence detecting section detects the convergence even when the output of the counter exceeds a predetermined upper limit, the switching section disconnects the moving element from the closed loop control section.

In another preferred embodiment, the value representing the amount of time in which the moving element is connected to the closed loop control section is the number of times that the closed loop control section performs its loop repeatedly.

In another preferred embodiment, if the output of the counter is less than the upper limit when the switching section switches the connection of the closed loop control section to the next moving element upon the detection of the convergence by the convergence detecting section, the upper limit of the next moving element is changed according to the output of the counter.

In another preferred embodiment, the switching section connects at least two of the moving elements to the displacement sensing section simultaneously.

In another preferred embodiment, a bias voltage, of which the magnitude is approximately equal to or greater than the amplitude of the high-frequency signal, is applied to both the fixed electrode and the movable electrode.

Still another microactuator according to the present invention includes: a substrate; a moving element, which is supported on the substrate in a displaceable position; a driving section for outputting a drive signal that causes displacement in the moving element; a displacement sensing section for sensing the displacement of the moving element; a switching section, which is provided for an interconnection line that connects the driving section and/or the displacement sensing section to the moving element so as to switch the interconnection line from a connected state into a disconnected state, or vice versa; and a calibrating section for correcting a first output of the displacement sensing section, which is obtained with the interconnection line connected, with a second output of the displacement sensing section, which is obtained with the interconnection line disconnected.

Yet another microactuator according to the present invention includes: a substrate; a moving element, which is supported on the substrate in a displaceable position; a driving section for outputting a drive signal that causes displacement in the moving element; and a displacement sensing section for sensing the displacement of the moving element being supplied with the drive signal. The moving element includes a fixed electrode, which is fixed on the substrate, and a movable electrode, which faces the fixed electrode. The movable electrode includes a first conductive portion and a second conductive portion, which are arranged substantially symmetrically to each other with respect to a predetermined axis, and is supported so as to tilt freely around the axis. The fixed electrode includes a first electrode, which faces the first conductive portion of the movable electrode with a gap, and a second electrode, which faces the second conductive portion of the movable electrode with a gap. The driving section generates a first drive signal to be applied to the first electrode and a second drive signal, which has a different magnitude from that of the first drive signal and which is applied to the second electrode. The displacement sensing section includes: a high-frequency signal generating section for outputting a high-frequency signal, of which the frequency is equal to or higher than a primary resonance frequency of the moving element; a first load impedance component, which is connected to the first electrode at a first terminal; a second load impedance component, which is connected to the second electrode at a second terminal; and a high frequency detecting section, which is connected to the first and second terminals. The first drive signal on which the high-frequency signal is superposed is applied to the other terminal of the first load impedance component that is opposite to the first terminal. The second drive signal on which the high-frequency signal is superposed is applied to the other terminal of the second load impedance component that is opposite to the second terminal. The high frequency detecting section compares the phases and/or the amplitudes of the high-frequency signal between the first and second terminals, thereby sensing the displacement of the moving element.

A deformable mirror according to the present invention includes one of the microactuators described above. A light reflective region is defined in at least a portion of the moving element.

A system according to the present invention includes one of the microactuators described above.

A driving method according to the present invention is a method of driving a microactuator including a moving element. The method includes the steps of: outputting a drive signal that causes displacement in the moving element; storing a correlation between the displacement of the moving element and the drive signal; sensing the displacement of the moving element being supplied with the drive signal; and calibrating the correlation with the drive signal and the output of the displacement sensing section.

BRIEF DESCRIPTION OF THE SEVERAL VIEWS OF THE DRAWINGS

FIGS. 11($a$) and 11($b$) are graphs showing correlations between the voltage command value D and displacement of a moving element;

FIG. 14($a$) illustrates the schematic configuration of a non-linear D/A converter 176 according to the sixth preferred embodiment of the present invention, and FIG. 14($b$) is a graph showing correlations between the voltage command value D and the displacement Z in its calibrating section 178.

DETAILED DESCRIPTION OF THE INVENTION

Hereinafter, preferred embodiments of the present invention will be described with reference to the accompanying drawings.

Embodiment 1

Figure 2:
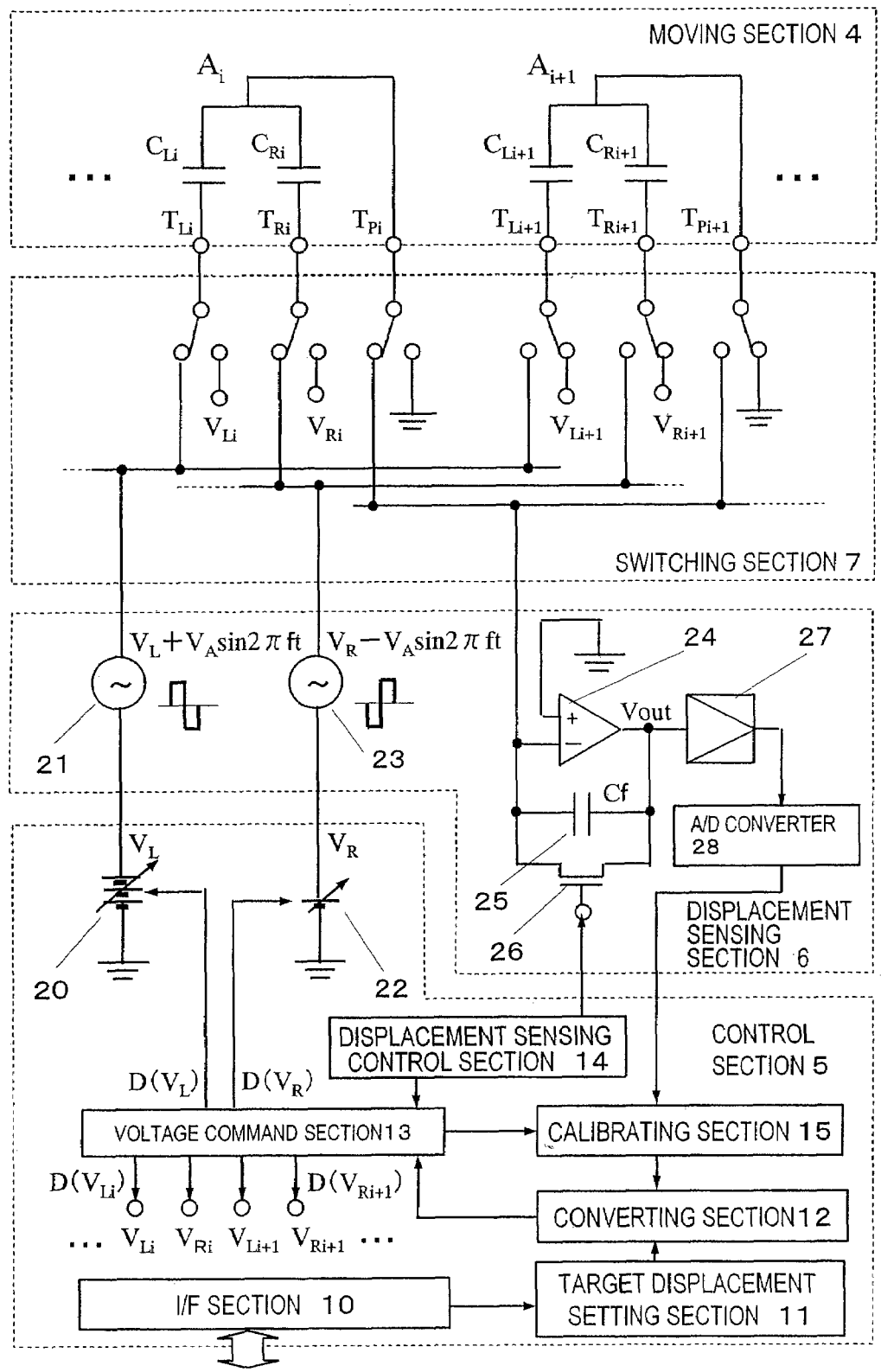
FIG. 2 shows the schematic configuration of a driver circuit for the microactuator of the first preferred embodiment of the present invention.
Figure 3:
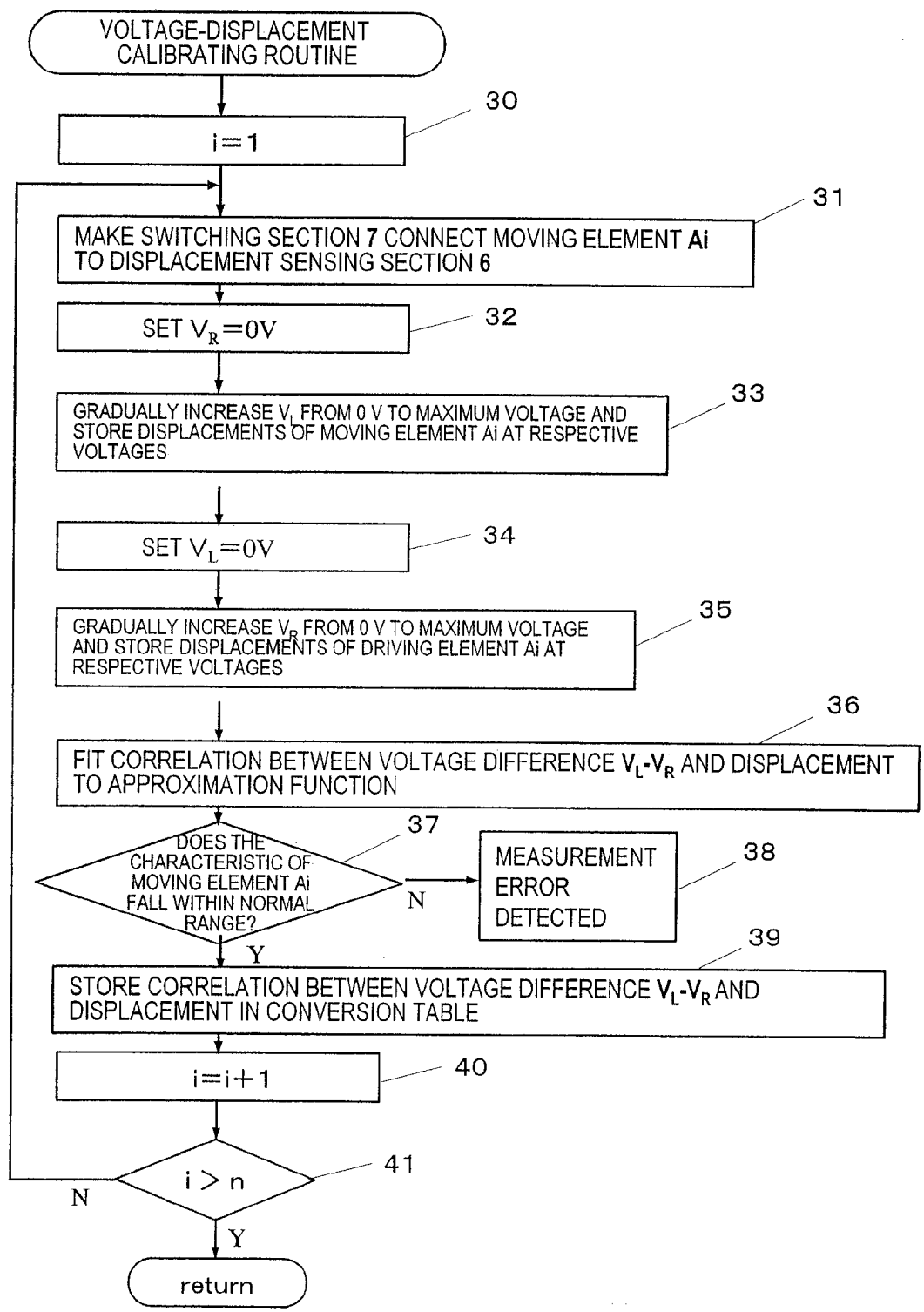
FIG. 3 is a flowchart showing a calibrating operation routine according to the first preferred embodiment of the present invention.

First, a first preferred embodiment of a microactuator according to the present invention will be described with reference to FIGS. 1 through 3. The microactuator of this preferred embodiment is an electrostatic actuator that performs a tilting operation. Such a microactuator may be fabricated by semiconductor device processing technologies, for example. The microactuator of this preferred embodiment is applicable to a deformable mirror for controlling the reflection direction of light in multiple stages.

Figure 1:
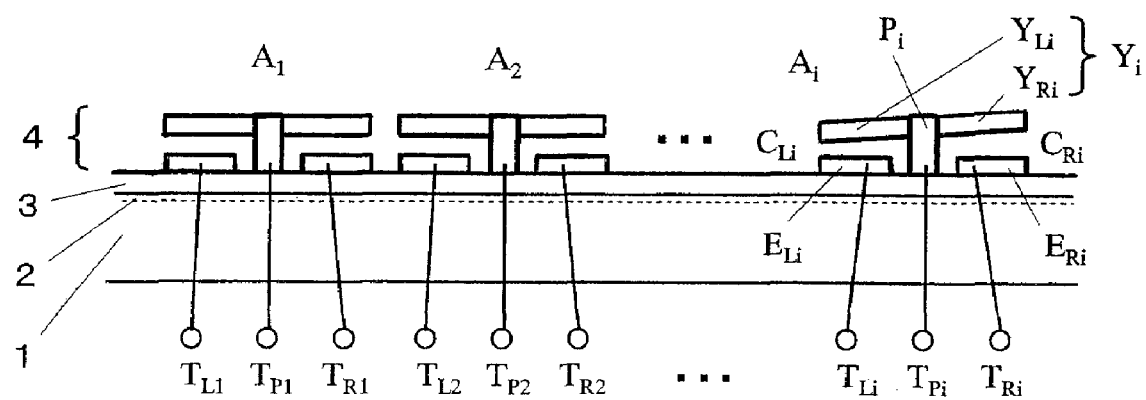
FIG. 1 illustrates the schematic configuration of a microactuator according to a first preferred embodiment of the present invention.

First, referring to FIG. 1, illustrated is the schematic configuration of a microactuator according to this preferred embodiment. As shown in FIG. 1, a driver circuit 2 is provided on a substrate 1, which may be a silicon wafer, and is covered with an insulating layer 3 with a thickness of at least 30 μm. A moving section 4 is formed of a number n (which is an integer equal to or greater than two) of moving elements A1 through An on the insulating layer 3. In the moving section 4, the respective moving elements A1 through An have the same configuration. Thus, an $i^{th}$ (where i is an integer equal to or greater than one) moving element Ai will be described as an example. The moving element Ai includes two fixed electrodes $E_{Li}$ and $E_{Ri}$, a movable electrode Yi provided so as to face these fixed electrodes $E_{Li}$ and $E_{Ri}$, and a pair of conductive posts Pi that supports this movable electrode Yi in a tilting position.

The moving element Ai has a horizontally symmetrical shape with respect to the posts Pi. The movable electrode Yi includes a first conductive portion $Y_{Li}$ and a second conductive portion $Y_{Ri}$. The first conductive portion $Y_{Li}$ faces the first electrode $E_{Li}$ with a gap and the second conductive portion $Y_{Ri}$ faces the second electrode $E_{Ri}$ with a gap. The upper surface of the movable electrode Yi functions as a reflective mirror for reflecting incoming light.

When a potential difference is created between the first electrode $E_{Li}$ and the movable electrode Yi or between the second electrode $E_{Ri}$ and the movable electrode Yi, the movable electrode Yi tilts either counterclockwise or clockwise due to electrostatic force. As a result, the direction of the light reflected by the upper surface of the movable electrode Yi changes. By regulating the magnitude of the potential difference, the tilt angle of the movable electrode Yi can be controlled.

Suppose a capacitor formed by the first electrode $E_{Li}$ and the first conductive portion $Y_{Li}$ of the movable electrode Yi has a capacitance $C_{Li}$ and a capacitor formed by the second electrode $E_{Ri}$ and the second conductive portion $Y_{Ri}$ of the movable electrode Yi has a capacitance $C_{Ri}$. In that case, in the initial state in which the movable electrode Yi is in horizontal position, $C_{Li}=C_{Ri}$ is substantially satisfied.

The capacitances $C_{Li}$ and $C_{Ri}$ increase or decrease in mutually opposite directions according to the tilt and displacement of the movable electrode Yi. In this preferred embodiment, the displacement of the movable electrode Yi is sensed by detecting the variations in the capacitances $C_{Li}$ and $C_{Ri}$.

Terminals $T_{Li}$, $T_{Ri}$ and $T_{Pi}$ are connected to the fixed electrodes $E_{Li}$ and $E_{Ri}$ and posts Pi, respectively. These terminals are connected to the driver circuit 2 as via metals extending through the insulating layer 3.

Next, the driver circuit 2 will be described in detail with reference to FIG. 2, which shows the schematic configuration of a driver circuit for a microactuator according to this preferred embodiment.

The driver circuit 2 includes an overall control section 5, a displacement sensing section 6 for sensing the displacement of each moving element Ai and a switching section 7 for selecting a moving element as an object of displacement sensing by the displacement sensing section 6.

The control section 5 includes an I/F section 10, a target displacement setting section 11, a converting section 12, a voltage command section 13, a displacement sensing control section 14, a calibrating section 15, a first drive voltage generating section 20 and a second drive voltage generating section 22. In this preferred embodiment, the voltage command section 13 and the first and second drive voltage generating sections 20 and 22 together form a "driving section".

The I/F section 10 exchanges commands and data with an external control-related unit.

The target displacement setting section 11 sets the respective target displacements of the moving elements A1 through An in accordance with the output of the I/F section 10.

The converting section 12 converts the respective target displacements of the moving elements A1 through An into target data associated with the drive voltages. In the converting section 12, correlations between the drive voltages and displacements of the respective moving elements A1 through An are stored as a conversion table. The variation in characteristic among the respective moving elements A1 through An is corrected here.

In controlling the respective moving elements A1 through An, the voltage command section 13 outputs voltage command values $D(V_{L1})$ through $D(V_{Ln})$ and $D(V_{R1})$ through $D(V_{Rn})$ for displacing the moving elements A1 through An in accordance with the output of the converting section 12. The voltage command values $D(V_{L1})$ through $D(V_{Ln})$ and $D(V_{R1})$ through $D(V_{Rn})$ are associated with the drive voltages $V_{L1}$ through $V_{Ln}$ and $V_{R1}$ through $V_{Rn}$ to be applied to the terminals $T_{L1}$ through $T_{Ln}$ and $T_{R1}$ through $T_{Rn}$ of the fixed electrodes. On the other hand, in sensing the displacement of the moving element Ai, the voltage command section 13 changes the voltage command values $D(V_L)$ and $D(V_R)$ such that the difference $V_L-V_R$ between the DC components $V_L$ and $V_R$ of the drive voltages to be applied to the fixed electrode terminals $T_{Li}$ and $T_{Ri}$ is changed at a predetermined timing. In this preferred embodiment, one of $V_L$ and $V_R$ is set equal to 0 V and the other is increased from 0 V step by step on a predetermined voltage basis as an example. The control values of $V_L$ and $V_R$ generated by the voltage command section 13 and their timings of change are controlled in accordance with the output of the displacement sensing control section 14.

The displacement sensing control section 14 instructs the voltage command section 13 to change the voltage command values $D(V_L)$ and $D(V_R)$. Also, the displacement sensing control section 14 turns ON the transistor 26 of the displacement sensing section 6 and keeps it ON for a predetermined period of time, thereby removing the offset of the sensing signal Vout. In this manner, the variation in the sensing signal Vout due to the change of the voltage command values $D(V_L)$ and $D(V_R)$ can be canceled.

The calibrating section 15 receives the voltage command values $D(V_L)$ and $D(V_R)$ from the voltage command section 13 and the displacement sensed for the moving element Ai from the displacement sensing section 6, respectively, thereby compiling the correlations between the voltage command values $D(V_L)$ and $D(V_R)$ and the displacements. These correlations are fitted with an approximation curve of a predetermined form such that the measuring errors are eliminated. Then, the resultant interpolated correlations are stored in the conversion table of the converting section 12.

In accordance with the voltage command value $D(V_L)$ supplied from the voltage command section 13, the first drive voltage generating section 20 generates a DC voltage $V_L$. Likewise, in accordance with the voltage command value $D(V_R)$ supplied from the voltage command section 13, the second drive voltage generating section 22 generates a DC voltage $V_R$.

The displacement sensing section 6 includes a first high-frequency signal generating section 21, a second high-frequency signal generating section 23, an operational amplifier 24, a capacitor 25, the transistor 26, an amplifier 27 and an A/D converter 28.

The first high-frequency signal generator 21 generates an AC voltage with an amplitude $V_A$ and a frequency f. The frequency f may be a predetermined value falling within the range of 100 kHz to 1 MHz and is supposed to be higher than the primary resonance frequency fo (of 1 kHz to 10 kHz) of the moving element Ai. The first drive voltage generating section 20 and the first high-frequency signal generating section 21 are connected in series together. And a first output voltage $V_L+V_A \sin(2\pi ft)$ is obtained as the sum of their outputs.

The second high-frequency signal generating section 23 generates an AC voltage, which has the same amplitude $V_A$ and the same frequency f as those of the AC voltage generated by the first high-frequency signal generating section 21 but the phase of which is different by 180 degrees from that of the AC voltage generated by the first high-frequency signal generating section 21. The second drive voltage generating section 22 and the second high-frequency signal generating section 23 are connected in series together. And a second output voltage $V_R-V_A \sin(2\pi ft)$ is obtained as the sum of their outputs.

If connection to the moving element Ai has been selected by the switching section 7, then the first and second output voltages $V_L+V_A \sin(2\pi ft)$ and $V_R-V_A \sin(2\pi ft)$ are input through the terminals $T_{Li}$ and $T_{Ri}$, respectively, and the output through the terminal $T_{Pi}$ is input to the operational amplifier 24. The output Vout of a circuit consisting of the operational amplifier 24 and the capacitor 25 with capacitance Cf is given by the following Equation (1), of which the second term of the right side represents an offset caused by the variations $\Delta V_L$ and $\Delta V_R$ of the drive voltages $V_L$ and $V_R$. Accordingly, if this offset is eliminated by turning the MOS transistor 26 ON before the detection as described above, a signal for detecting the variation $C_{Ri}-C_{Li}$ in electrostatic capacitance can be obtained accurately.

$$V\text{out}=((C_{Ri}-C_{Li})/Cf)\cdot V_A \sin(2\pi ft)+(C_{Ri}\Delta V_R+C_{Li}\Delta V_L)/Cf \qquad (1)$$

The output Vout is amplified by the amplifier 27, converted into digital data by the A/D converter 28 and then output to the calibrating section 15.

The switching section 7 switches each of the moving elements A1 through An from a drive mode in which the moving element is driven and controlled into a sensing mode in which its displacement is sensed, or vice versa. In FIG. 2, the moving element Ai has been turned to the sensing mode, is connected to the displacement sensing section 6 as described above, and its response characteristic is being checked out. On the other hand, in FIG. 2, the moving element $A_{i+1}$ has been turned to the drive mode, in which voltages $V_{Li+1}$ and $V_{Ri+1}$ as instructed by the voltage command section 13 are applied to the fixed electrode terminals $T_{Li+1}$ and $T_{Ri+1}$, respectively, and the movable electrode terminal $T_{Pi+1}$ is connected to the ground potential, whereby the moving element $A_{i+1}$ is driven to the target position.

Hereinafter, it will be described with reference to FIG. 3 how the microactuator with such a configuration operates. FIG. 3 is a flowchart showing the calibrating operation routine to be carried out by the microactuator of this preferred embodiment.

When the system is started, or when the temperature sensor (not shown) has sensed a temperature variation, of which the magnitude is equal to or greater than a predetermined value, or when the built-in timer has counted an operating time, of which the length is equal to or greater than a prescribed value, since the conversion data was updated last time, the microactuator of this preferred embodiment updates the conversion table of the moving elements A1 through An as stored in the converting section 12.

First, by setting i=1 (in Step 30), the first moving element A1 is selected as the moving element Ai of which the displacement should be sensed. The switching section 7 connects the moving element Ai to the displacement sensing section 6 (in Step 31). In this case, all moving elements but the moving element Ai are disconnected from the displacement sensing section 6.

During the displacement sensing, the voltage command values $D(V_L)$ and $D(V_R)$ output by the voltage command section 13 are changed and the output voltages $V_L$ and $V_R$ of the first and second drive voltage generating sections 20 are applied in multiple stages, thereby sensing the displacement of the moving element Ai in each of those stages. More specifically, first, $V_R$ is set equal to 0 V (in Step 32) and $V_L$ is gradually increased from 0 V to the maximum voltage Vmax, thereby measuring the displacement of the moving element Ai at each of those voltages.

The displacement data thus obtained is stored, along with the respective $V_L$ values, in the calibrating section 15 (in Step 33). Next, $V_L$ is set equal to 0 V (in Step 34) and $V_R$ is gradually increased from 0 V to the maximum voltage Vmax, thereby measuring the displacement of the moving element Ai at each of those voltages. The displacement data thus obtained is stored, along with the respective $V_R$ values, in the calibrating section 15 (in Step 35). When the measurement is finished, the calibrating section 15 fits the relationship between the voltage difference $V_L-V_R$ and the displacement data to a predetermined approximation function, thereby calculating the coefficients of respective terms of the approximation function and the correlated values thereof (in Step 36).

For the coefficients and correlated values of the respective terms of this approximation function, ranges, in which every value is regarded as a normal value, are defined in advance. And it is determined whether or not these values obtained fall within these normal ranges (in Step 37). If any value falls out of its normal range, then it is determined that there is an error in the result of measurement (in Step 38). The contents of the error processing change according to the coefficients and correlated values. Specifically, if any value falls out of its normal range just slightly, then measurement is carried out again. For example, if the moving element is hardly displaced irrespective of the voltage value of $V_L$ or $V_R$, then the moving element or the displacement sensing section 6 is regarded as out of order, the error is identified, and the update of the conversion table is prohibited.

On the other hand, if every value falls within its normal range, then the results of measurement are regarded as valid, the conversion table is updated (in Step 39) and the next moving element starts to be measured (in Step 40). When the measurement of the $n^{th}$ moving element An is finished, the conversion table compiling routine ends.

When the conversion table has been compiled, the microactuator starts to perform a control operation by using that table. The switching section 7 turns all of the moving elements A1 through An to the drive mode in which the moving elements are driven and controlled.

In this preferred embodiment, every moving element performs an open loop control. When the target displacement of each of the moving elements A1 through An is set by the target displacement setting section 11, the target displacement is converted into target data associated with the drive voltage by the converting section 12. Being supplied with the drive voltage instructed by the voltage command section 13, each of the moving elements A1 through An is controlled to its desired position.

As described above, the microactuator of this preferred embodiment includes a configuration for sensing the magnitude of displacement, caused by its own driving force, by itself. Accordingly, no external displacement measuring device is needed, no troublesome setting-related work (such as alignment) needs to be done, and a conversion table for correcting the variation in characteristic among individual moving elements can be compiled very easily.

In addition, the microactuator can make the measurement while built in a system, and therefore, can cope with any variation in the characteristic of a moving element due to either a variation in time or an environmental variation such as a temperature variation.

Furthermore, the microactuator senses the displacement while making the switching section 7 selectively and cyclically connect the single displacement sensing section 6 to one moving element after another. Accordingly, even an actuator with a lot of moving elements can have a significantly reduced number of sensing signal generators, amplifiers and A/D converters for the purpose of displacement sensing. As a result, the circuit size can be reduced and the chip cost can be cut down.

In the preferred embodiment described above, the drive voltage generating section 20 and high-frequency signal generating section 21 are separately provided and connected together. Alternatively, these generating sections 20 and 21 may be implemented as a single D/A converter such that the output voltage $V_L+V_A \sin(2\pi ft)$ is obtained by modulating the output control signal of the voltage command section 13 at the frequency f. Also, the waveform of the AC voltage does not have to be a sine wave but may also be a rectangular wave as well. The same statement applies to the drive voltage generating section 22 and high-frequency signal generating section 23, too. Then, the majority of the signal generating circuit for displacement sensing can be used in common with the circuit for drive and control. As a result, the overall circuit configuration can be simplified.

Also, in the voltage command section 13 described above, only the DC voltage components $V_L$ and $V_R$ are variable. Optionally, the amplitude $V_A$ of the AC voltage component may also be variable, too. In particular, if the amplitude $V_A$ is increased when the potential difference $V_L-V_R$ has a small absolute value and decreased when the potential difference $V_L-V_R$ has a large absolute value, then the following two effects are achieved. Firstly, the responsivity can be increased while the effects of the AC voltage component on the displacement of the moving element is minimized. When the potential difference $V_L-V_R$ has a small absolute value, the displacement of the moving element Ai is small and the variation $C_{Li}-C_{Ri}$ in electrostatic capacitance is also small. Thus, the sensing signal Vout has a small amplitude and it is difficult to achieve a high SNR. Meanwhile, the attraction produced by the AC voltage component on the fixed electrode $E_{Li}$ side of the moving element Ai is almost in balance with that produced by the AC voltage component on the fixed electrode $E_{Ri}$ side thereof. As a result, these attractions cancel each other and hardly affect the displacement of the moving element if ever. The opposite characteristics are exhibited if the potential difference $V_L-V_R$ has a large absolute value. For that reason, if the amplitude $V_A$ is increased when the potential difference $V_L-V_R$ has a small absolute value and decreased when the potential difference $V_L-V_R$ has a large absolute value, then the responsivity can be increased while the effects of the AC voltage component on the displacement of the moving element is minimized. Secondly, the moving element can have a broadened measurable displacement range with respect to the same supply voltage. The measurable displacement range of the moving element is defined by the DC voltage setting range and is obtained by removing the AC voltage component from the overall voltage. By decreasing the amplitude $V_A$ when the drive voltage $V_L$ or $V_R$ has a large absolute value, the moving element can have a broadened measurable displacement range with respect to the same supply voltage.

In the preferred embodiment described above, the displacement sensing section 6 has just a single channel. Alternatively, the displacement sensing section 6 may have a plurality of channels, the moving elements A1 through An may be divided into a plurality of blocks, and each channel of the displacement sensing section 6 may perform the cyclic check on its associated block.

Also, in the preferred embodiment described above, the moving elements are connected to the displacement sensing section 6 one by one. However, a plurality of moving elements may be connected to the single displacement sensing section 6 at the same time. In that case, the variations of the respective moving elements are averaged and the variation in overall characteristic can be sensed with good accuracy. If every moving element changes its characteristic according to a substantially uniform pattern in response to an environmental variation such as a temperature variation, then the overall correction data obtained in this manner may be added to the conversion data of each moving element.

Furthermore, in the preferred embodiment described above, the drive signal is supposed to be a DC signal. However, the drive signal does not have to be a DC signal. Alternatively, if a drive signal having a low frequency that is equal to or lower than the primary resonance frequency of a moving element is supplied as the drive signal that produces a desired displacement in the moving element and if the amplitude and phase of the moving element are measured by the displacement sensing section 6, then the response characteristic of the moving element can be estimated, too. Also, if the resonance point is searched for by shifting the frequency of the drive signal in the vicinity of the primary resonance frequency of the moving element, then the resonance frequency of the moving element itself can be measured and the response characteristic of the moving element can also be estimated accurately, too. The calibrating section 15 can calculate the voltage-displacement curve of the moving element based on these response characteristics and can use it by storing it in the converting section 12. As to the primary resonance frequency fo of the moving element and the tilt-related spring constant k, the variation in the primary resonance frequency fo can be detected and the static relationship between the drive voltage and the displacement can be calibrated by utilizing the relationship that fo is proportional to the square root of k.

Furthermore, in the preferred embodiment described above, the moving element is supposed to be an electrostatic moving element and the displacement sensing section 6 adopts an electrostatic capacitance detection method in sensing the displacement. However, the present invention is in no way limited to this specific preferred embodiment. Alternatively, a piezoelectric element may be used as the moving element and the displacement may be sensed by utilizing those piezoelectric effects.

Embodiment 2

Figure 4:
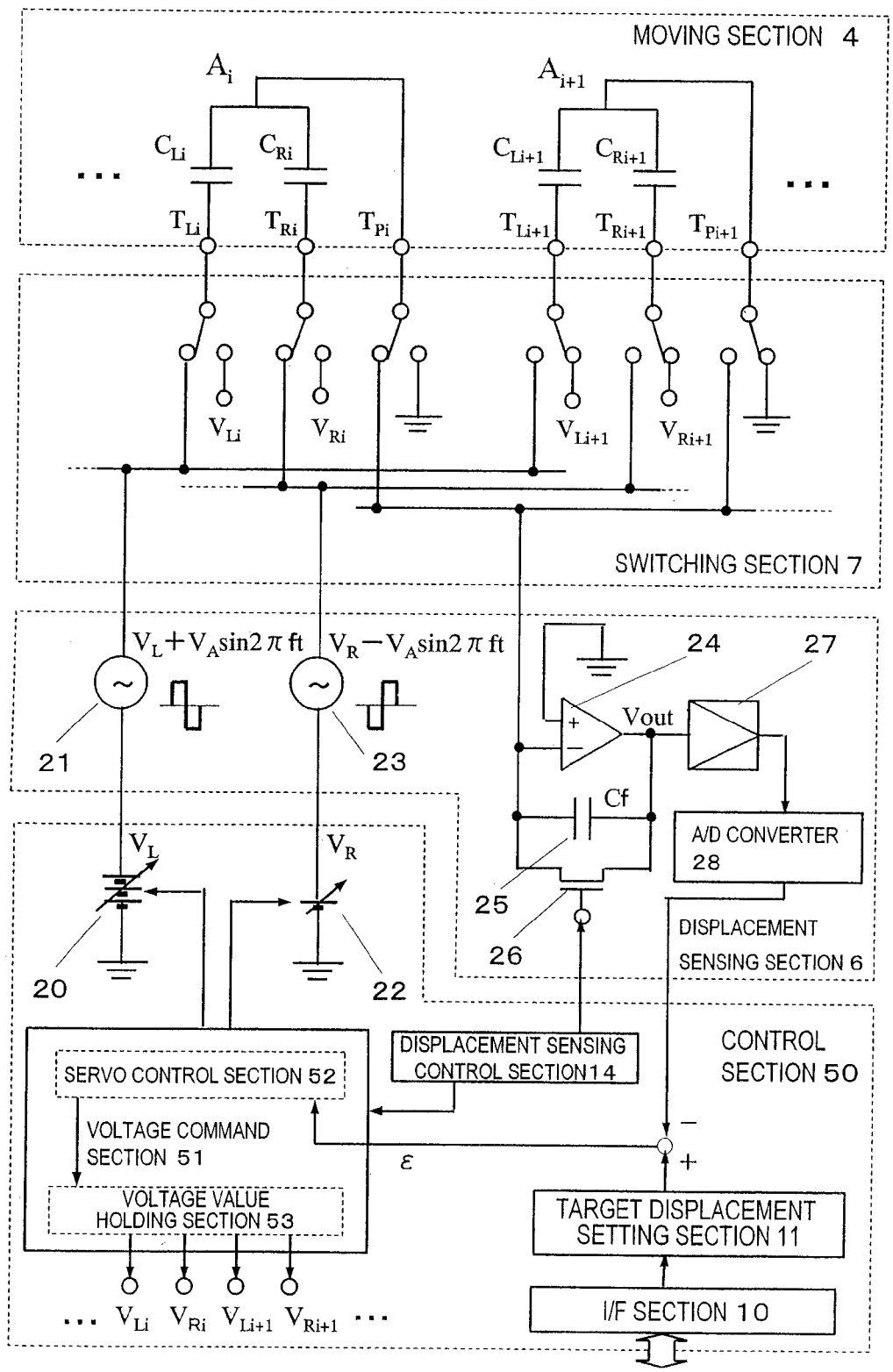
FIG. 4 illustrates the schematic configuration of a microactuator according to a second preferred embodiment of the present invention.
Figure 5:
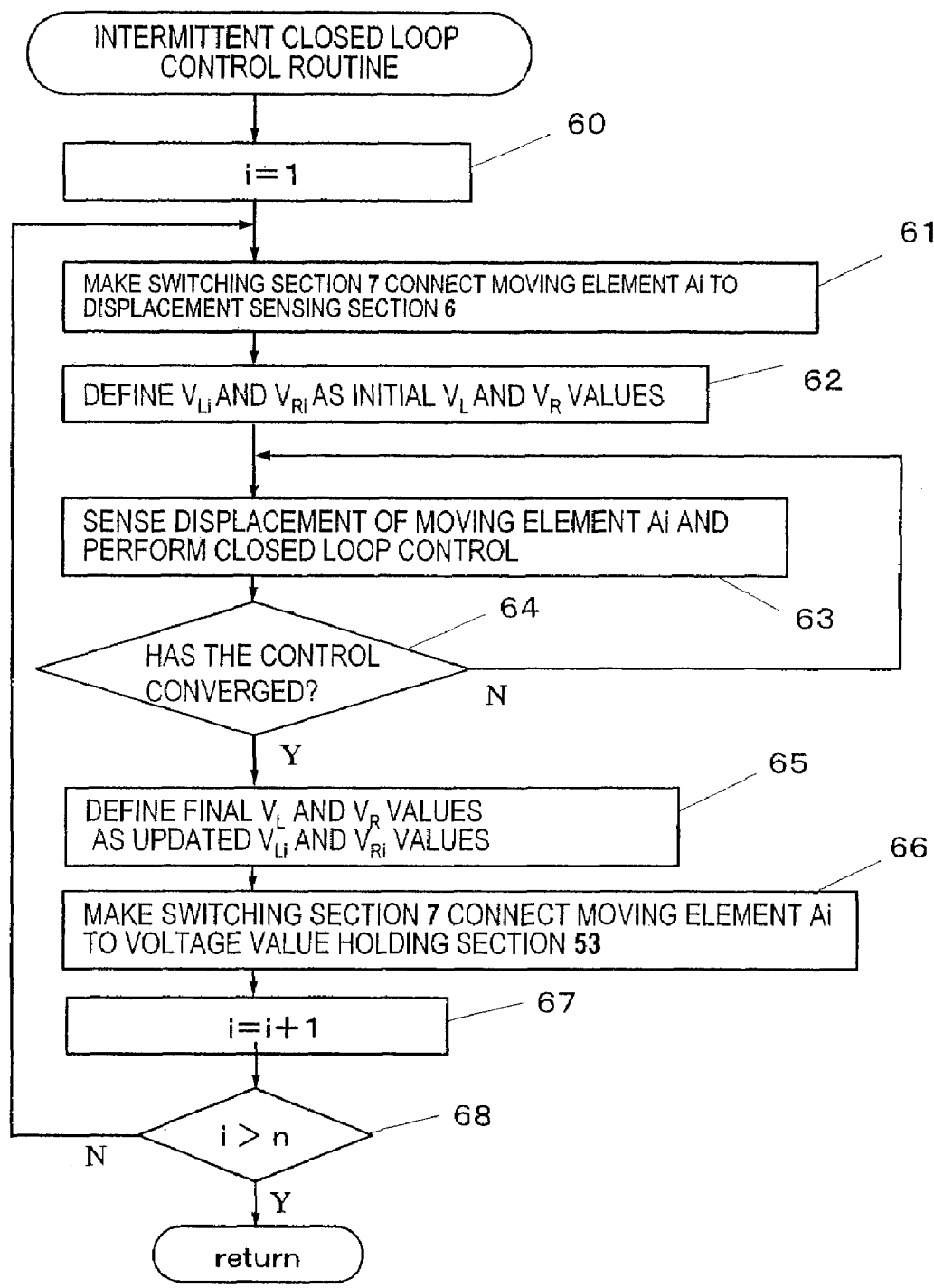
FIG. 5 is a flowchart showing an intermittent closed loop control routine according to the second preferred embodiment of the present invention.

Hereinafter, a second preferred embodiment of a microactuator according to the present invention will be described with reference to FIGS. 4 and 5. FIG. 4 illustrates the schematic configuration of a microactuator according to this preferred embodiment.

In the microactuator of this preferred embodiment, each of the moving section 4, displacement sensing section 6, switching section 7, I/F section 10, target displacement setting section 11 and displacement sensing control section 14 has the same configuration as the counterpart as already described for the first preferred embodiment. The difference between this and first preferred embodiments lies in the configuration of the control section 50. In this preferred embodiment, the control section 50 performs an intermittent closed loop control on the moving elements A1 through An by using the output of the displacement sensing section 6.

The control section 50 includes a voltage command section 51, which includes a servo control section 52 and a voltage value holding section 53.

The servo control section 52 includes a PID controller, which receives the difference between the target displacement setting section 11 and the displacement sensing section 6 as an error signal $\epsilon$ and realizes a desired control characteristic. By providing the command values of the voltages $V_L$ and $V_R$ as its control outputs, the servo control section 52 carries out a closed loop control on a selected moving element Ai. Also, when the value of the error signal $\epsilon$ and its time differential value decrease to predetermined values or less, the servo control section 52 judges that the control described above has converged. Then, the control section 52 terminates the closed loop control on the moving element Ai, switches it into an open loop control, and performs a closed loop control on the next moving element Ai+1. More specifically, on detecting the convergence of the control, the servo control section 52 outputs the command values of the voltages $V_L$ and $V_R$ at that point in time to the voltage value holding section 53. In response, the voltage value holding section 53 keeps outputting the command values of the voltages $V_L$ and $V_R$ as command values $V_{Li}$ and $V_{Ri}$ for the moving element Ai until the servo control section 52 inputs new command values about the moving element Ai again. The switching section 7 switches the connection of the moving element Ai from the displacement sensing section 6 to the voltage value holding section 53 and also switches the connection of the moving element Ai+1 from the voltage value holding section 53 to the displacement sensing section 6.

Hereinafter, it will be described with reference to FIG. 5 how the microactuator having such a configuration operates. FIG. 5 is a flowchart showing an intermittent closed loop control routine to be done by the microactuator of this preferred embodiment.

First, by setting i=1 (in Step 60), the first moving element A1 is selected as a moving element Ai to be subjected to the closed loop control. The switching section 7 connects the moving element Ai to the displacement sensing section 6 (in Step 61). At this point in time, all of the moving elements but the moving element Ai are connected to the voltage value holding section 53 and an open loop control is being carried out based on its output value.

As the initial control voltage values $V_L$ and $V_R$ of the moving element Ai, the $V_{Li}$ and $V_{Ri}$ values that were held in the voltage value holding section 53 last time are used (in Step 62). The displacement sensing section 6 senses the displacement of the moving element Ai and the servo control section 52 performs a closed loop control such that the magnitude of the displacement sensed matches the target displacement output by the target displacement setting section 11 (in Step 63).

When the absolute value of the error signal ϵ between the displacement sensed and the target displacement gets equal to a predetermined value α and when the absolute value of the time differential value Δϵ/Δt of the error signal ϵ gets equal to or smaller than a predetermined value β, the servo control section 52 detects the convergence of the control (in Step 64). The servo control section 52 outputs the command values of the voltages $V_L$ and $V_R$ at that point in time to the voltage value holding section 53. In response, the voltage value holding section 53 holds these voltage command values $V_L$ and $V_R$ as the command values $V_{Li}$ and $V_{Ri}$ for the moving element Ai (in Step 65). Also, the switching section 7 switches the connection of the moving element Ai from the displacement sensing section 6 to the voltage value holding section 53 (in Step 66). In this manner, the mode of control on the moving element Ai can be switched from the closed loop control to the open loop control successfully and the procedure advances to a closed loop control on the next moving element Ai+1 (in Step 67). When the closed loop control on the $n^{th}$ moving element An is completed (in Step 68), the intermittent closed loop control routine will complete one cycle.

This intermittent closed loop control routine is carried out every time the output value of the target displacement setting section 11 is updated at least. As a result, the moving elements A1 through An are controlled to their respective desired positions. Optionally, this routine may also be carried out at regular intervals.

The microactuator of the preferred embodiment described above performs a closed loop control while making the switching section 7 selectively and cyclically connect the single displacement sensing section 6 and the servo control section 52 to one moving element after another. Once the control has converged on a moving element, the microactuator performs an open loop control on the moving element so as to hold its state. Accordingly, even an actuator with a lot of moving elements can have a significantly reduced number of sensing signal generators, amplifiers and A/D converters for the purpose of displacement sensing. As a result, the circuit size can be reduced and the chip cost can be cut down.

Embodiment 3

Figure 6:
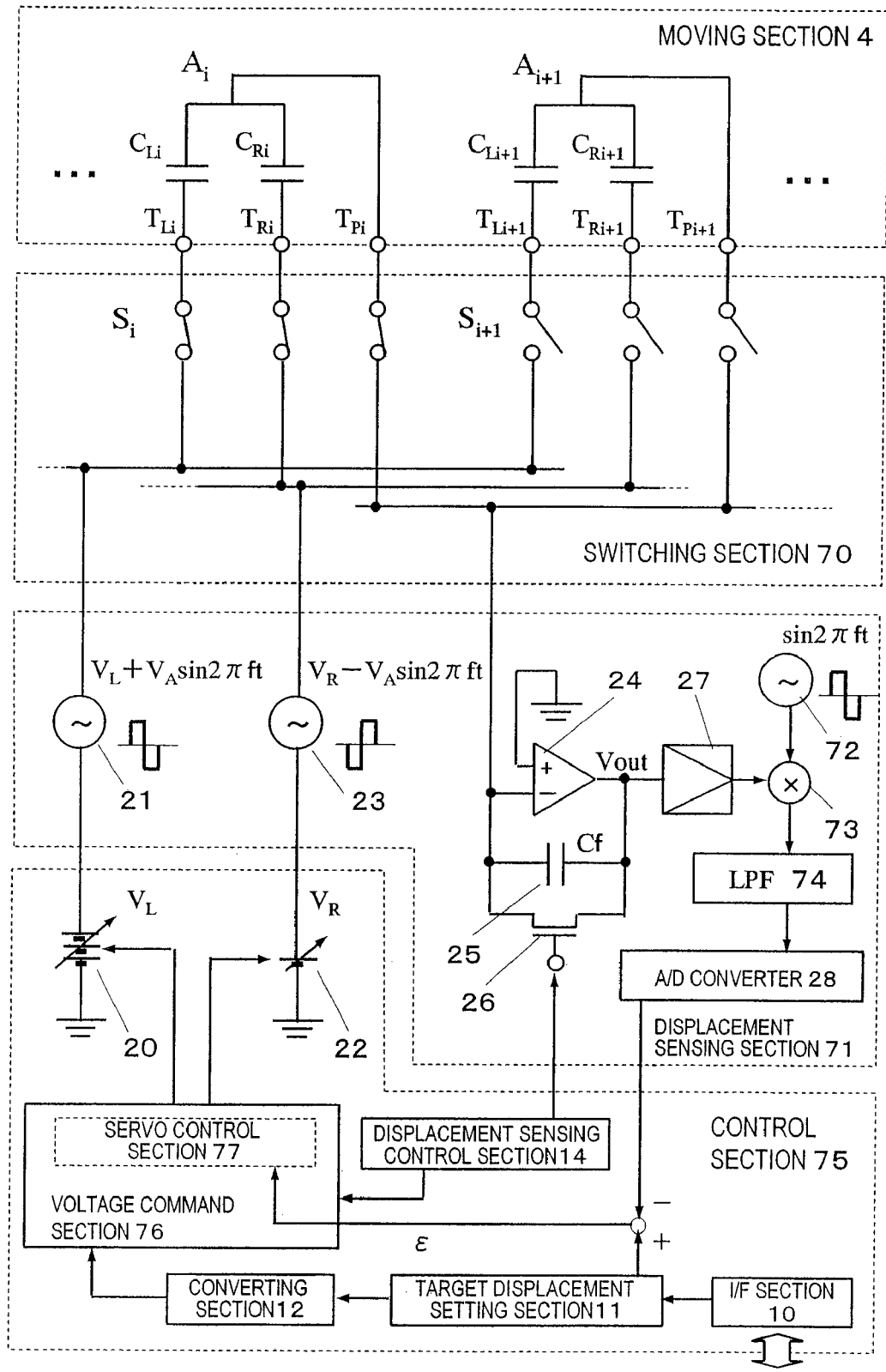
FIG. 6 illustrates the schematic configuration of a microactuator according to a third preferred embodiment of the present invention.
Figure 7:
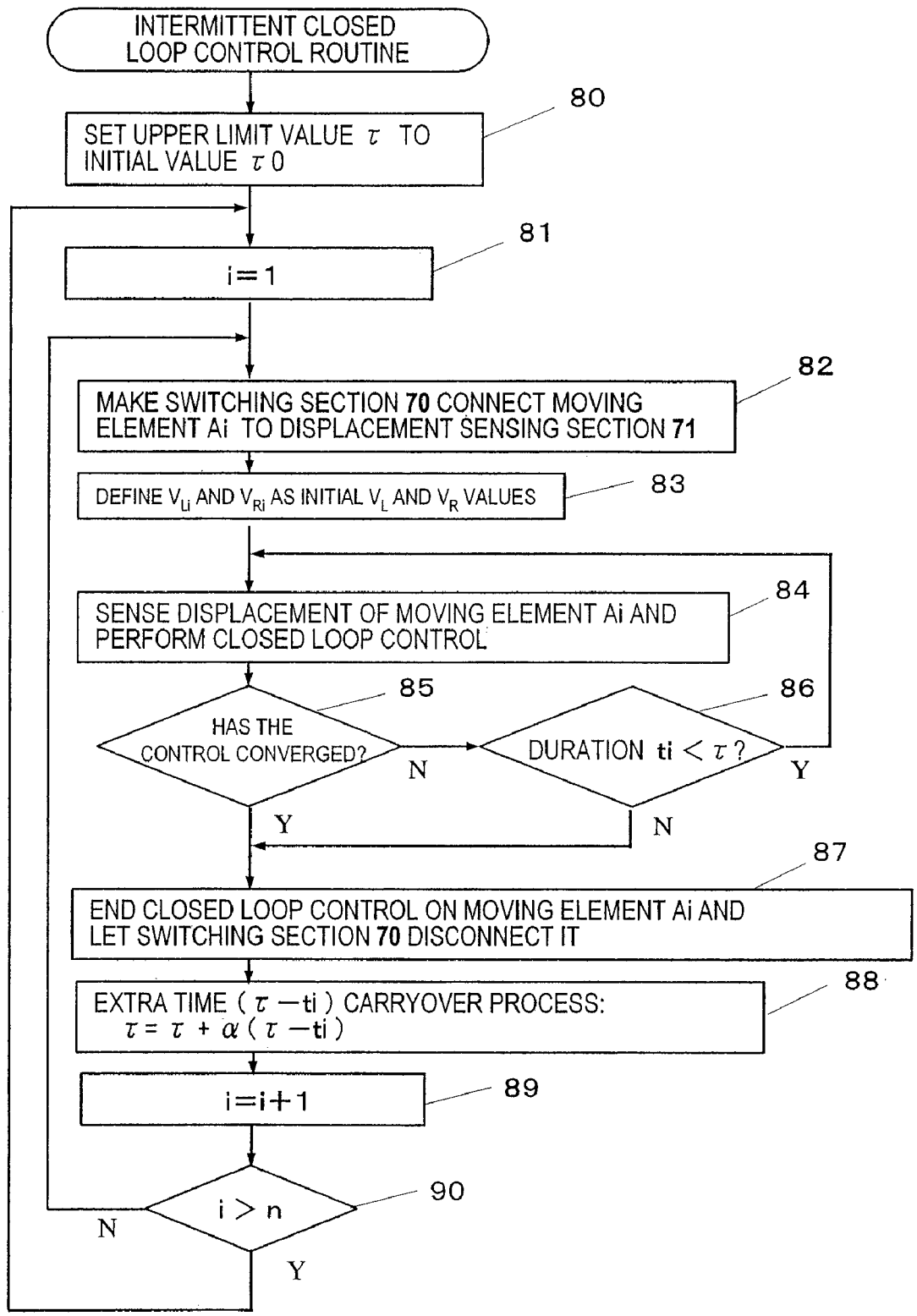
FIG. 7 is a flowchart showing an intermittent closed loop control routine according to the third preferred embodiment of the present invention.

Hereinafter, a third preferred embodiment of a microactuator according to the present invention will be described with reference to FIGS. 6 and 7. FIG. 6 illustrates the schematic configuration of a microactuator according to this preferred embodiment.

In the microactuator of this preferred embodiment, each of the moving section 4, I/F section 10, target displacement setting section 11, displacement sensing control section 14, first drive voltage generating section 20, first high-frequency signal generating section 21, second drive voltage generating section 22, second high-frequency signal generating section 23, operational amplifier 24, capacitor 25, MOS transistor 26, amplifier 27 and A/D converter 28 has the same configuration as the counterpart as already described for the second preferred embodiment.

The difference between this and second preferred embodiments lies in the configurations of the switching section 70, displacement sensing section 71 and control section 75. In this preferred embodiment, the displacement sensing section 71 additionally has a configuration for extracting only the signal with the frequency f from the displacement sensing signal, thereby reducing the offset caused by the variations $\Delta V_L$ and $\Delta V_R$ in the drive voltages $V_L$ and $V_R$ of the second term on the right side of Equation (1) and increasing the accuracy of the closed loop control. Also, once the closed loop control by the servo control section 77 has converged, the switching section 70 disconnects the moving element Ai and produces a high impedance state at the terminals $T_{Li}$, $T_{Ri}$ and $T_{Pi}$, thereby retaining the charge that has been stored between the electrodes. In this manner, an intermittent closed loop control is carried out simply without using any voltage value holding section.

The switching section 70 includes switches S1 through Sn, which are associated with the moving elements A1 through An, respectively. A switch Si is connected to the terminals $T_{Li}$, $T_{Ri}$ and $T_{Pi}$ of the moving element Ai. When turned ON, the switch connects the respective terminals to the driver circuit including the displacement sensing section 71. On the other hand, the switch in OFF state turns the respective terminals into floating. The ON/OFF states of these three terminals are changed simultaneously.

The displacement sensing section 71 includes not just all components of the counterpart of the second preferred embodiment described above but also an oscillator 72, a multiplier 73 and a low pass filter 74. The oscillator 72 generates an AC signal having the same frequency f as that of the first high-frequency signal generating section 21. Also, the AC signal generated by the oscillator 72 has its phase matched with that of the voltage generated by the first high-frequency signal generating section 21. The multiplier 73 multiplies the outputs of the amplifier 27 and oscillator 72 together. As a result, only a signal component with the frequency f is extracted from the output component of the amplifier 27 and a DC voltage, which is proportional to the amplitude of the signal component with the frequency f, is output. The output of the multiplier 73 is filtered by the low pass filter 74 and then A/D converted by the A/D converter 28. In this manner, the offset voltage, generated by the variations $\Delta V_L$ and $\Delta V_R$ in the drive voltages $V_L$ and $V_R$ during the closed loop control, can be reduced and the position sensing accuracy is increased.

The control section 75 includes a voltage command section 76, which includes a servo control section 77.

The servo control section 77 receives the difference between the target displacement setting section 11 and the displacement sensing section 71 as an error signal ϵ and carries out a closed loop control on a selected moving element Ai by providing the command values of the voltages $V_L$ and $V_R$ as its control outputs.

The control section 75 further includes a clock counter (not shown) for counting how long each moving element Ai has been connected to the servo control section 77 since its associated Si was turned ON in the switching section 70.

An upper limit value $\tau$ is set on the amount of time that can be allotted to the closed loop control on each moving element Ai. When the value of the error signal $\epsilon$ and its time differential value get equal to or smaller than predetermined values to converge the control or when the duration of the closed loop control reaches the upper limit value T, the control section 75 finishes the closed loop control on the moving element Ai. In a normal state, the upper limit value $\tau$ is defined large enough to converge the control. The upper limit value $\tau$ may either be a fixed value or reflect the amount of time it took to control the moving element in the past. For example, if the actual convergence time ti−1 is shorter than the upper limit value $\tau$ of the previous moving element Ai−1, then part or all of the extra time $\tau$-ti−1 may be carried over and added to the upper limit value $\tau$ of the moving element Ai.

When the closed loop control by the servo control section 77 on the moving element Ai is finished, the switching section 70 turns the switch Si OFF, thereby turning the terminals $T_{Li}$, $T_{Ri}$ and $T_{Pi}$ into floating. As a result, as long as the loss due to current leakage is sufficiently small, the quantities of charges stored in the capacitors $C_{Li}$ and $C_{Ri}$, formed by the moving element Ai, are kept constant and the displacement of the moving element Ai is maintained as it was when the closed loop control was finished.

Then, the switching section 70 turns the next switch Si+1 ON and the control section 75 performs a closed loop control on its associated moving element Ai+1. In this manner, the closed loop control is carried out time-sequentially on one moving element after another. And when the closed loop control on the last moving element An is completed, the processing returns to the first moving element A1 again and the closed loop control of the second cycle is carried out thereon. The period of time of this cycle will be referred to herein as a "frame period". The frame period is determined by the response performance that the microactuator needs to exhibit and a condition to minimize the loss of the quantities of charges stored in the capacitors $C_{Li}$ and $C_{Ri}$ due to the current leakage. The upper limit value $\tau$ of the time allotted to each moving element Ai is set such that this frame period satisfies those conditions. For example, if the upper limit value $\tau$ is a fixed value, then n·$\tau$ will be the frame period. Particularly when the closed loop control is carried out as a digital control, however, the upper limit value $\tau$ or the duration ti may be compared by counting the number of times the closed loop control has been carried out repeatedly and comparing the number counted with the maximum number of loops, instead of actually keeping time. Such a loop number management is also essentially a type of time management because the time is managed indirectly. However, the procedure of the management can be simplified.

Hereinafter, it will be described with reference to FIG. 7 how the microactuator having such a configuration operates. FIG. 7 is a flowchart showing an intermittent closed loop control routine to be done by the microactuator of this preferred embodiment.

First, the upper limit value $\tau$ is set to an initial value $\tau 0$ (in Step 80). The initial value $\tau 0$ is 1/n of one frame period and is stored in a ROM in advance. Next, by setting i=1, the first moving element A1 is selected as a moving element Ai to be subjected to the closed loop control (in Step 81).

Next, the switching section 70 turns the switch Si ON and connects the moving element Ai to the displacement sensing section 71 (in Step 82). At this point in time, the switches associated with all of the moving elements but the moving element Ai are in OFF state.

The initial control voltage values $V_L$ and $V_R$ of the moving element Ai are obtained by getting the output of the target displacement setting section 11 converted by the converting section 12 (in Step 83). The displacement sensing section 71 senses the displacement of the moving element Ai and the servo control section 77 performs a closed loop control such that the magnitude of the displacement sensed matches the target displacement output by the target displacement setting section 11 (in Step 84).

When the absolute value of the error signal $\epsilon$ between the displacement sensed and the target displacement gets equal to a predetermined value $\alpha$ and when the absolute value of the time differential value $\Delta\epsilon/\Delta t$ of the error signal $\epsilon$ gets equal to or smaller than a predetermined value $\beta$, the servo control section 77 detects the convergence of the control (in Step 85). Unless the convergence is detected, the duration ti is further compared with the upper limit value $\tau$. And if ti<$\tau$ is satisfied, then the closed loop control is continued (in Step 86).

When the convergence is detected or when the duration ti exceeds the upper limit value, the servo control section 77 finishes the closed loop control on the moving element Ai and the switching section 70 turns the switch Si OFF, thereby turning the terminals $T_{Li}$, $T_{Ri}$ and $T_{Pi}$ into floating (in Step 87).

Next, the extra time ($\tau$−ti−1) is multiplied by the coefficient $\alpha$ and the product is carried over to the upper limit value $\tau$ of the processing time of the closed loop control on the next moving element (in Step 88). The coefficient $\alpha$ is supposed to be a value satisfying 0<$\alpha$<1, thereby preventing the extra time from being carried over and accumulated infinitely. More preferably, the coefficient $\alpha$ satisfies 0<$\alpha$<exp(−1/n), thereby reducing the degree of influence of the extra time carried over within one frame period to the predetermined (1/e) or less.

Subsequently, the i value is incremented by one and the processing advances to a closed loop control on the next moving element Ai+1 (in Step 89). In this manner, the closed loop control is sequentially carried out on one moving element after another. And when the first cycle is completed (i.e., when the closed loop control on the $n^{th}$ moving element An is finished), the second cycle is started by performing a closed loop control on the first moving element A1 again (in Step 90)

The microactuator of the preferred embodiment described above is designed such that when the closed loop control by the servo control section 77 has converged, the switching section 70 disconnects the moving element Ai and produces a high impedance state at the terminals $T_{Li}$, $T_{Ri}$ and $T_{Pi}$, thereby retaining the charge that has been stored between the electrodes. Thus, an intermittent closed loop control can be carried out cyclically on a lot of moving elements by using a simple configuration.

In addition, the upper limit value $\tau$ is set on the time that can be allotted to the closed loop control on each moving element. Consequently, the microactuator can have a sufficient frame period, no matter whether the closed loop control has converged or not.

Furthermore, this upper limit value $\tau$ is defined based on the amount of time it has taken to carry out the control on the moving elements. As a result, a sufficient frame period can be guaranteed and the accuracy of the closed loop control can be improved at the same time.

Embodiment 4

Figure 9:
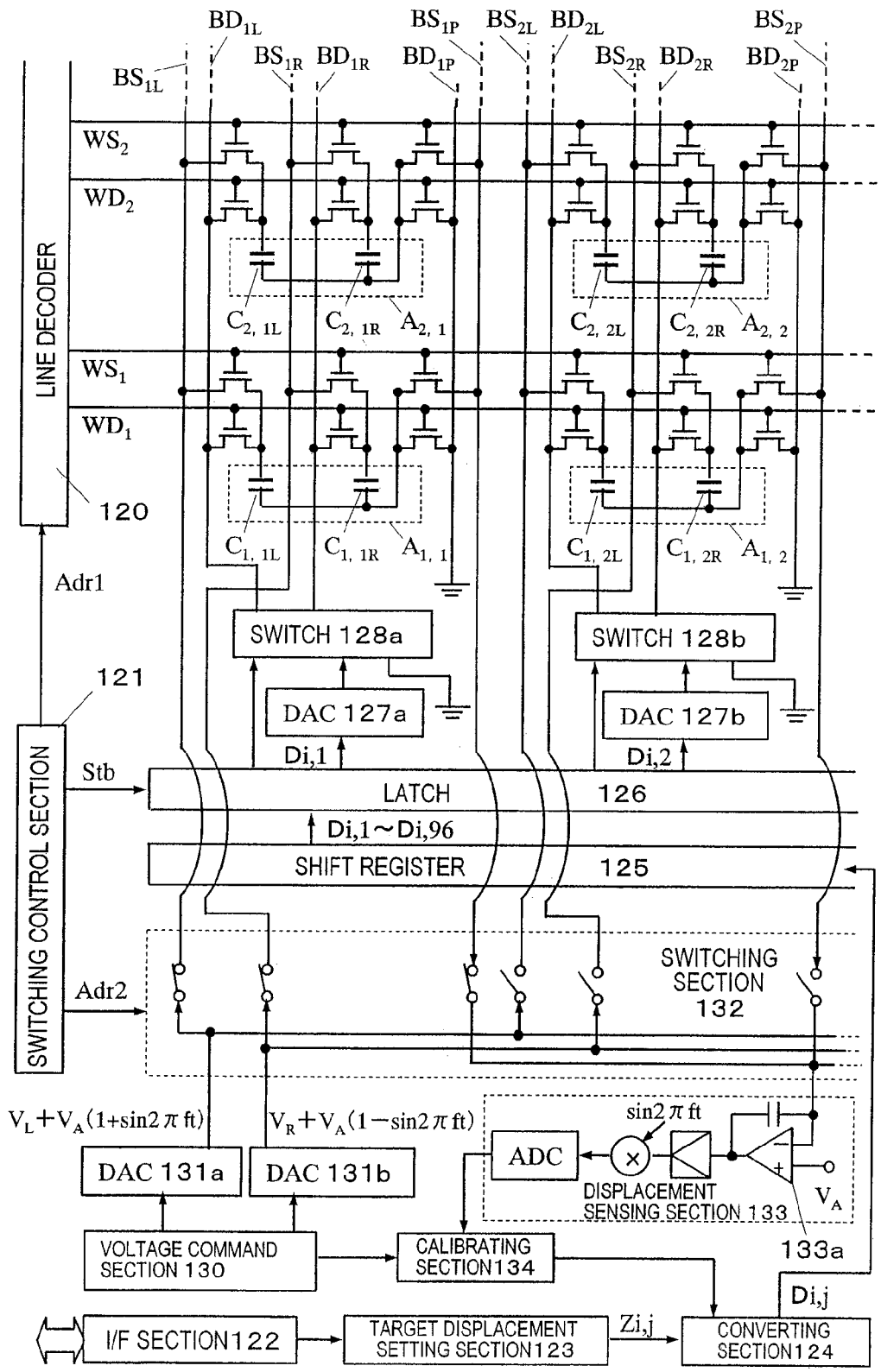
FIG. 9 shows the schematic configuration of a driver circuit 100a according to the fourth preferred embodiment of the present invention.
Figure 10:
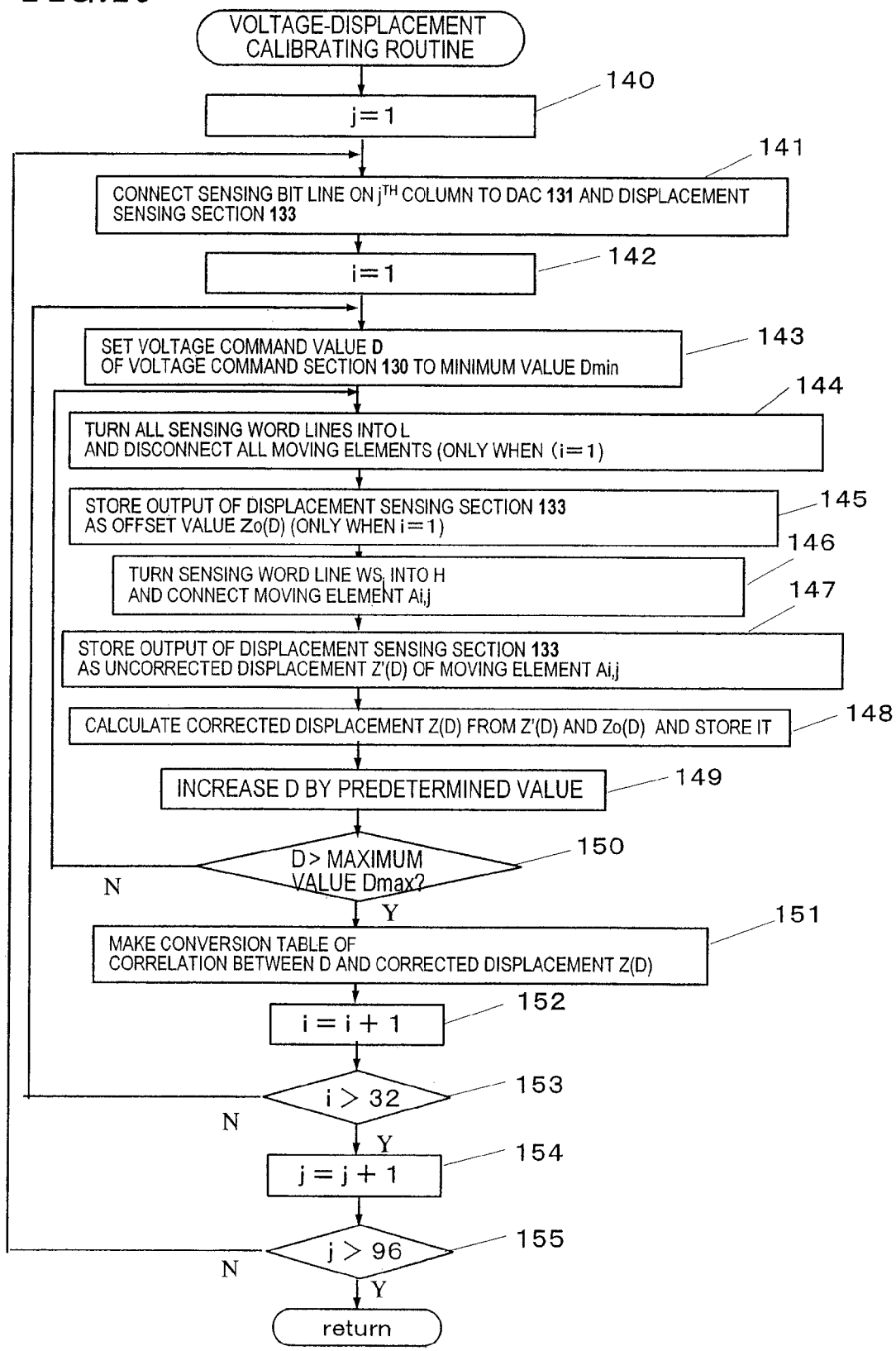
FIG. 10 is a flowchart showing a calibrating operation routine according to the fourth preferred embodiment of the present invention.

A fourth preferred embodiment of a microactuator according to the present invention will be described with reference to FIGS. 8 through 10. The microactuator of this preferred embodiment is an electrostatic actuator for performing a vertical operation and a dual-axis tilting operation, and is applied to a deformable mirror for a compensating optical system.

Figure 8:
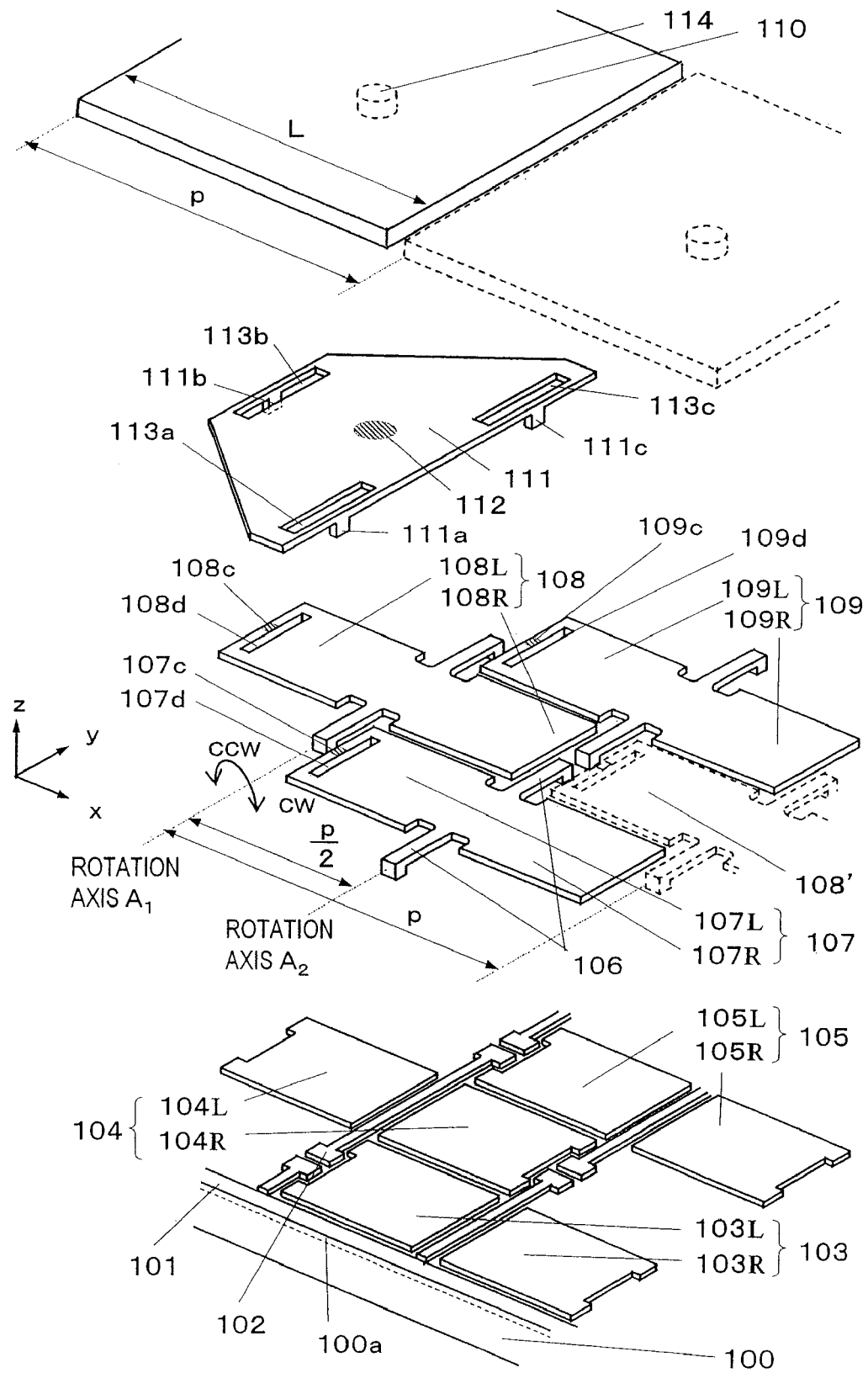
FIG. 8 is an exploded perspective view of a microactuator according to a fourth preferred embodiment of the present invention.

FIG. 8 is an exploded perspective view of a microactuator according to this preferred embodiment. In FIG. 8, just one micromirror unit is illustrated on a large scale. The single micromirror unit is given displacement with a degree of freedom of three by three sets of moving elements that can be driven independently of each other, and can perform the vertical and dual-axis tilting operations. Each of those moving elements includes a pair of a yoke and a fixed electrode.

1,024 micromirror units are arranged in total as a two-dimensional array of 32×32 micromirror units. The overall number of moving elements, each including a yoke and a fixed electrode as a pair, is 3,072, which is three times as large as the total number of micromirror units.

On a substrate 100, provided is a driver circuit 100a, on which an insulating layer 101 has been deposited. And on the insulating layer 101, a base 102 and three pairs of fixed electrodes 103 to 105 are provided. The base 102 and fixed electrodes 103 to 105 are formed by patterning a conductive film of aluminum (Al), polysilicon or any other suitable material. The fixed electrode 103 includes a first electrode 103L and a second electrode 103R, for which voltages can be defined independently of each other. Likewise, the fixed electrode 104 also includes first and second electrodes 104L and 104R and the fixed electrode 105 also includes first and second electrodes 105L and 105R.

The first and second electrodes 103L, 104L, 105L and 103R, 104R, 105R are connected to the driver circuit 100a on the substrate 100 by way of via metals (not shown), which are provided in the insulating layer 101. The driver circuit 100a can apply mutually independent voltages, all of which fall within the range of 0 V to 30 V, to the first and second electrodes 103L, 104L, 105L and 103R, 104R, 105R. Each of the applied voltages may be set to a multi-bit value of 12 bits, for example.

Each of the three yokes 107, 108 and 109 is secured with a pair of hinges 106. Furthermore, an intermediate coupling member 111 for coupling these yokes 107, 108 and 109 to the micromirror 110 is also provided. The hinges 106 are bonded to, and electrically continuous with, the base 102. Each base 102 is connected to the driver circuit 100a by way of a via metal (not shown) provided in the insulating layer 101. Adjacent bases 102 are electrically isolated from each other and are connected to the driver circuit 100a independently of each other.

These yokes 107, 108 and 109 face their associated fixed electrodes 103, 104 and 105, respectively, so as to function as "movable electrodes". The yokes 107, 108 and 109 are formed by patterning an electrically conductive material such as aluminum (Al) or polysilicon, and are electrically continuous with the base 102 so as to have the ground potential. Each of these yokes 107, 108 and 109 has a first portion 107L, 108L or 109L and a second portion 107R, 108R or 109R, which respectively face the first and second electrodes 103L & 103R, 104L & 104R and 105L & 105R. These yokes 107, 108 and 109 have quite the same shape. Thus, any statement that applies to one of these three yokes automatically applies to the other two unless stated otherwise.

The yoke 108 is supported so as to rotate around an axis of rotation A1, while the other yokes 107 and 109 are supported so as to rotate around another axis of rotation A2. Supposing a direction perpendicular to the axis of rotation A1 (or A2) is an x direction and the moving elements are arranged at a pitch p in the x direction, the axes of rotation A1 and A2 are defined so as to shift from each other by a half pitch (=p/2) in the x direction. In this manner, the yokes that are adjacent to each other in the y direction are arranged in a checkerboard pattern so as to shift from each other by the half pitch in the x direction. One of the hinges 106 to support the yoke 107 is provided to extend in the gap between the yoke 108 and the adjacent yoke 108'.

For example, if a drive voltage is applied to the first electrode 103L, then the first portion 107L of the yoke 107 will be attracted toward the first electrode 103L. On the other hand, if a drive voltage is applied to the second electrode 103R, then the second portion 107R will be attracted toward the second electrode 103R. In this manner, the rotational force can be selectively produced around the axis A of rotation either clockwise CW or counterclockwise CCW.

The yoke 107 is coupled to the protrusion 111a of the intermediate coupling member 111 at the drive point 107c (indicated by hatching in FIG. 8) in the vicinity of one free end of the first portion 107L. A groove hole 107d is provided through the yoke 107 near the drive point 107c.

The intermediate coupling member 111 includes three protrusions 111a, 111b and 111c, which are coupled to the drive point 107c of the yoke 107, the drive point 108c of the yoke 108 and the drive point 109c of the yoke 109, respectively. Accordingly, by driving and rotating the yokes 107, 108 and 109 independently of each other, the displacements of the protrusions 111a, 111b and 111c are controllable independently and the position of the intermediate coupling member 111 is fixed. Groove holes 113a, 113b and 113c are bored through the intermediate coupling member 111 in the vicinity of the protrusions 111a, 111b and 111c, respectively.

The micromirror 110 is coupled to the hatched portion 112 of the intermediate coupling member 111 with the protrusion 114. Since the micromirror 110 and the intermediate coupling member 111 are coupled together, the position of the micromirror 110 is determined by that of the intermediate coupling member 111. The micromirrors 110 are arranged at a pitch p of 100 μm in the x direction and have a mirror length L of 98 μm as measured in the x direction.

By applying drive voltages independently to the first electrodes 103L, 104L, 105L and second electrodes 103R, 104R, 105R, the micromirror 110 can be driven bidirectionally (i.e., in positive and negative directions), no matter whether the micromirror 110 needs to be displaced in the z direction or tilted around the x axis and/or y axis.

Next, the driver circuit 100a will be described in detail with reference to FIG. 9, which shows the schematic configuration of the driver circuit 100a for the microactuator of this preferred embodiment. A plurality of moving elements, each consisting of a yoke and two fixed electrodes, are also shown along with the driver circuit 100a and are identified by Ai,j. The subscripts i and j respectively represent the row and column addresses thereof in a two-dimensional array of moving elements. A single micromirror unit is made up of three moving elements. Thus, a single micromirror unit is associated with a set of three j values. For example, three moving elements to move the same micromirror are identified by A1,1, A1,2 and A1,3. The micromirror units are arranged as a 32×32 array. Thus, i is a natural number falling within the range of 1 through 32 and j is a natural number falling within the range of 1 through 96.

Six MOS transistors are connected as switching elements to each moving element Ai,j. Each of these MOS transistors operates in the enhancement mode. Thus, the switch is turned ON when its gate voltage is increased to H level but turned OFF when its gate voltage is decreased to L level. To minimize the loss of voltage by each MOS transistor, the gate voltage used is boosted by a booster (not shown).

Among the six MOS transistors, the lower three MOS transistors are used to carry out an open loop control on the moving element Ai,j. When a driving word line WDi is raised to H level, the three transistors respectively connect driving bit lines $BDj_L$, $BDj_R$ and $BDj_P$ to the first electrode, second electrode and yoke of the moving element Ai,j.

On the other hand, the upper three MOS transistors are used to sense the displacement of the moving element Ai,j and calibrate the relationship between the voltage and the displacement. When a sensing word line WSi is raised to H level, the three transistors respectively connect sensing bit lines $BSj_L$, $BSj_R$ and $BSj_P$ to the first electrode, second electrode and yoke of the moving element Ai,j.

The driving word lines WD1 through WD32 and the sensing word lines WS1 through WS32 are connected to a line decoder 120. Only a word line that has been selected in response to an address signal Adr1 supplied from a switching control section 121 is raised to H level. The line decoder 120 is implemented as a demultiplexer.

The configuration will be further described along the flow of signals during the open loop control operation.

An I/F section 122 exchanges commands and data with an external control device. The externally input data includes data about the shape of the wavefront to be defined by the deformable mirror. This wavefront shape data is given either as data representing displacement in z direction at each coordinate point on an xy plane or as wavefront mode coefficient data by a Zernike polynomial, for example. To reduce the transfer load, each of these types of data may be compressed before being transmitted. Examples of imaginable methods include an intra-frame compression method in which the wavefront shape is compressed within the given frame, an inter-frame compression method in which the difference between the wavefront shapes at the previous and current times is calculated, and a method in which two types of data compressed by these two methods are alternately transferred on a predetermined number of frames basis. Alternatively, in a simpler configuration, a desired one may be called up from multiple types of pre-registered wavefront shapes. In that case, the externally input data is the registration number of the wavefront shape.

In accordance with the output of the I/F section 122, a target displacement setting section 123 generates target displacement data Zi,j specifying the target displacement of each moving element Ai,j. Each item of target displacement data Zi,j is 20-bit data consisting of a 12-bit part representing the i and j addresses and an 8-bit part representing the magnitude of the target displacement in 256 stages from −128 through 127. The target displacement setting section 123 outputs one item of target displacement data Zi,j after another to a converting section 124 while incrementing the j value first. And when the j value reaches the maximum value of 96, the target displacement setting section 123 will increment the i value. Consequently, the target displacement data is output in the order of $Z_{1,1}$, $Z_{1,2}$, ..., $Z_{1,96}$, $Z_{2,1}$, $Z_{2,2}$ and so on.

The converting section 124 includes a conversion table, which outputs voltage command data Di,j corresponding to the target displacement data Zi,j that has been input there as an address. The voltage command data Di,j is 11-bit data that takes one of 2,048 values of −1024 through 1023, and the most significant bit thereof represents its sign (i.e., positive or negative). That is to say, the most significant bit shows whether the fixed electrode to drive is the first electrode of the moving element Ai,j or the second electrode thereof. This conversion table is drawn up by a calibrating section 134 and then stored in a rewritable memory in the converting section 124. The voltage command data Di,j is supplied to a shift register 125 bit by bit. No sooner has the voltage command data Di,j been transferred to the shift register 125 than the voltage command data Di,j+1 of the next moving element Ai,j+1 starts to be transferred.

The shift register 125 sequentially transfers the voltage command data Di,j, supplied from the converting section 124, on a bit-by-bit basis. When the voltage command data Di,1 through Di,96 associated with the moving elements Ai,1 through Ai,96, respectively, have been transferred, the switching section 121 will output a strobe signal Stb to a latch 126. At this timing, the voltage command data Di,1 through Di,96 in the shift register 125 gets stored on the latch 126 at the same time. The shift register 125 has a transfer rate of 16.9 MHz and transfers 96 data items, each consisting of 11 bits, in 62.5 µs. On transferring the data to the latch 126, the shift register 125 starts to transfer the data associated with the moving elements Ai+1,1 through Ai+1,96 on the next row. Accordingly, the latch 126 receives the strobe signal Stb in a period of about 62.5 µs, which corresponds to the period in which the voltage is applied to the moving elements Ai,1 through Ai,96.

The voltage command data Di,1 through Di,96 stored in the latch 126 is converted by 96 D/A converters 127 and 96 switches 128 into drive voltages to be applied to the fixed electrodes of respective moving elements Ai,j. In the following description, only the D/A converter 127a and switch 128a, which are associated with the moving element Ai,1, will be described as an example. However, each of the other 95 D/A converters or switches has the same configuration as its counterpart.

The D/A converter 127a is a 10-bit D/A converter, which receives the lower 10 bits of the 11-bit voltage command data Di, 1 and outputs a drive voltage of an associated magnitude that varies from 0 V through 30 V.

The switch 128a receives the most significant bit of the 11-bit voltage command data Di,1 and connects a driving bit line $BD_{1L}$ to ground potential and a driving bit line $BD_{1R}$ to the output of the D/A converter 127a, respectively, if the most significant bit is zero. On the other hand, if the most significant bit is one, the switch 128a connects the driving bit line $BD_{1L}$ to the output of the D/A converter 127a and the driving bit line $BD_{1R}$ to ground potential, respectively. As a result, if the target displacement of the moving element Ai,1 has a positive value, the output of the D/A converter 127a is connected to the second electrode thereof. Meanwhile, if the target displacement has a negative value, the output of the D/A converter 127a is connected to the first electrode thereof. Consequently, the tilt of the moving element can be controlled bidirectionally (i.e., both in the positive and negative directions).

In this manner, each switch 128 selects one of two driving bit lines $BD_{1L}$ and $BD_{1R}$ in an associated one of 96 pairs and applies the drive voltage, supplied from its associated D/A converter 127, to that driving bit line.

At the same time, the switching control section 121 supplies an address signal Adr1, which selectively turns only an $i^{th}$ driving word line WDi into H level, to the line decoder 120. When the driving word line WDi is raised to H level, the moving elements Ai,1 through Ai,96 become electrically continuous with the driving bit lines $BD_{1L}$, $BD_{1R}$ and $BD_{1P}$. As a result, an open loop control is carried out according to the magnitude of target displacement. As described above, the period of time in which the drive voltage is applied to the moving elements Ai,1 through Ai,96 is 62.5 µs. Meanwhile, the moving elements Ai,j have primary resonance frequencies of 70 kHz to 100 kHz and response times of about 10 µs to about 14 µs, which are obtained as their inverse numbers. In this manner, the period of time in which the drive voltage is applied to the moving elements is defined sufficiently longer than the response times of the moving elements. Thus, the drive voltage can be applied continuously until the displacements of the moving elements have been settled sufficiently. As a result, it is possible to prevent the voltage between the electrodes from being varied significantly due to the displacements of the moving elements after the drive voltage has been applied thereto. Consequently, the moving elements can be displaced more precisely during the open loop control.

In this manner, during the open loop control, the i value is incremented in a period of 62.5 µs and desired displacements are produced in the moving elements Ai,1 through Ai,96 on each row. The amount of time it takes to carry out the open loop control on the moving elements of all 32 rows is 2 ms, which is one frame period.

Hereinafter, the configuration will be further described along the flow of signals during the calibrating operation. The calibrating operation is carried out when the system is started, for example. The basic flow of the calibrating operation is similar to that already described for the first preferred embodiment. The main differences between this and first preferred embodiments lie in that the position sensing accuracy is increased by eliminating the offset caused by the parasitic capacitance of lines, for example, and that the inverting output is eliminated by applying a bias voltage $V_A$ to the output of the D/A converter 131 and to the differential input of the displacement sensing section 133.

The voltage command section 130 generates voltage command values for two channels and supplies the outputs of these channels to the D/A converters 131a and 131b while switching those channels at a frequency of about 1 MHz to about 10 MHz. As a result, the D/A converter 131a outputs a voltage $V_L+V_A(1+\sin(2\pi ft))$, while the D/A converter 131b outputs a voltage $V_R+V_A(1-\sin(2\pi ft))$. Actually, the waveform of this AC voltage component with the amplitude $V_A$ and the frequency f is preferably not so much a sine wave as a rectangular wave. During the calibrating operation, the voltage command section 130 keeps the $V_A$ value constant most of the time, sets one of the drive voltages $V_L$ and $V_R$ equal to 0 V, and changes the other drive voltage in multiple stages. That is to say, this is a configuration obtained by additionally providing the bias voltage $V_A$ for the configuration already described for the first preferred embodiment. And the output voltages of the D/A converters 131a and 131b are always positive.

In response to an address signal Adr2 supplied from the switching control section 121, a switching section 132 connects the sensing bit lines $BSj_L$, $BSj_R$ and $BSj_P$ of the $j^{th}$ column to the D/A converters 131a and 131b and displacement sensing section 133, respectively.

Meanwhile, in response to the address signal Adr1 supplied from the switching control section 121, the line decoder 120 turns the sensing word line WSi of the $i^{th}$ row into H level. As a result, the sensing bit lines $BSj_L$, $BSj_R$ and $BSj_P$ are respectively connected to the first electrode, second electrode and yoke of the moving element Ai,j. In this manner, the first electrode, second electrode and yoke of a single selected moving element Ai,j are connected to the D/A converters 131a and 131b and displacement sensing section 133, respectively.

The configuration of the displacement sensing section 133 is basically the same as that of the displacement sensing section 71 of the third preferred embodiment described above. In this preferred embodiment, however, the bias voltage $V_A$ is applied to the non-inverting input of a first-stage differential amplifier 133a. In this manner, the bias voltage $V_A$ applied by the D/A converter 131 can be compensated for and the potential level relationship among the first electrode, second electrode and yoke of the moving element Ai,j during the open loop control can be maintained, and the decrease in calibrating precision can be minimized.

The calibrating section 134 receives the voltage command value from the voltage command section 130 and the displacement of the moving element Ai,j that has been sensed by the displacement sensing section 133, thereby defining the correlation between the voltage command value and the displacement. Measuring errors can be removed from these relationships by fitting them with an approximation curve of a predetermined format. Then, resultant interpolated relationships are stored in the conversion table of the converting section 124.

Hereinafter, it will be described with reference to FIG. 10 how the microactuator with such a configuration operates. FIG. 10 is a flowchart showing the calibrating operation routine to be done by the microactuator of this preferred embodiment.

First, by setting j=1 (in Step 140), the switching section 132 connects the sensing bit lines $BSj_L$, $BSj_R$ and $BSj_P$ of the $j^{th}$ column to the D/A converters 131a and 131b and displacement sensing section 133, respectively (in Step 141). Next, by setting i=1 (in Step 142), the switching section 132 selects the moving element Ai,j as the object of displacement sensing. The voltage command section 130 sets the voltage command value D equal to its minimum value Dmin (in Step 143). In this case, the drive voltages $V_R$ and $V_L$ are defined to be 0 V and 30 V, respectively, and the difference $V_R-V_L$ between them becomes equal to the lowest voltage of −30 V. In the following description, if the voltage command value D is negative, then $V_R=0$ V and $V_L$ is set to a positive value. On the other hand, if D is positive, then $V_L=0$ V and $V_R$ is set to a positive value. As already described, a high frequency signal has been superposed thereon for the purpose of displacement sensing.

Before the displacement of the moving element Ai,j is sensed, the switching control section 121 turns all of the sensing word lines WS1 through WS32 into L level, thereby disconnecting all of the moving elements A1,j through A32,j from the sensing bit lines $BSj_L$, $BSj_R$ and $BSj_P$ (in Step 144). The calibrating section 134 stores the output of the displacement sensing section 133 at this point in time as an offset value Z0(D) (in Step 145). Since the moving elements have been disconnected, the offset value Z0(D) represents the error component produced by the parasitic capacitance of lines or the drive voltages. It should be noted that these processing steps 144 and 145 are carried out only when i=1.

Subsequently, the switching control section 121 turns the sensing word line WSi into H level, thereby connecting the moving element Ai,j to the sensing bit lines $BSj_L$, $BSj_R$ and $BSj_P$ (in Step 146). The calibrating section 134 stores the output of the displacement sensing section 133 at this point in time as an uncorrected displacement Z'(D) (in Step 147). Then, the calibrating section 134 calculates a corrected displacement Z(D) from the uncorrected displacement Z'(D) and the offset value Z0(D) and stores it (in Step 148). Normally, Z(D)=Z'(D)−Z0(D) may be satisfied. However, the offset may also be corrected by using another correction equation obtained through experiments, for example.

Next, the voltage command value D is increased by a predetermined value (in Step 149). Thereafter, the displacement Z(D) is repeatedly measured until D gets equal to the maximum value Dmax (in Step 150). As a result, the displacements Z(D) measured with respect to the D values in multiple stages are stored in the calibrating section 134. The calibrating section 134 eliminates the measuring errors by fitting those values to a predetermined approximation function and obtains an 11-bit voltage command value D for each displacement (Z) value of eight bits while interpolating them with this approximation function. By adding 12-bit data representing the i, j addresses of the moving element Ai,j thereto, a conversion table, showing relationships between the displacement Z and voltage command value D of the moving element Ai,j, can be obtained (in Step 151).

Next, i is incremented (in Step 152) and a conversion table, showing relationships between the displacement Z and voltage command value D of the 32 moving elements A1,j through A32,j of the same $j^{th}$ column, is drawn up in the same way (in Step 153).

Subsequently, j is incremented (in Step 154) and conversion tables, showing relationships between the displacement Z and the voltage command value D, are compiled for all of the moving elements on the 96 columns (in Step 155).

FIGS. 11(a) and 11(b) are graphs showing correlations between the voltage command value D and displacement of a moving element. In FIG. 11(a), data about the offset correction is shown. The data points indicated by the crosses x in FIG. 11(a) represent the offset values Z0(D) measured. The data points indicated by the open triangles Δ there represent the uncorrected displacements Z'(D) measured. And the data points indicated by the open circles ○ there represent the corrected displacements Z(D) calculated according to the equation Z(D)=Z'(D)−Z0(D).

In this preferred embodiment, with the voltage command value D changed in thirteen stages, the displacement Z(D) is calculated with respect to each of those voltage command values D. The increases of the voltage command values D are not constant in their respective stages. Specifically, the closer to Dmax or Dmin the given voltage command value D, the greater the variation in displacement Z'(D) with respect to the voltage command value D. For that reason, the closer to Dmax or Dmin the voltage command value D gets, the smaller its increase is defined. By defining the increase of the voltage command value D in this manner with the nonlinear relationship between the voltage command value D and the displacement Z'(D) taken into account, the displacement Z'(D) can be increased substantially constantly.

In FIG. 11(b), the offset-corrected displacements Z(D) that have been fitted with an approximation function are represented as a solid curve. The approximation function used here is a quadratic function $Z(D)=\alpha D^2+\alpha D+\gamma$. In each of the quadrant in which D>0 and the quadrant in which D<0, the values of the coefficients α, β and γ are determined so as to minimize the fitting errors. In FIG. 11(b), the correlation between the voltage command value D yet to be calibrated and the displacement Z is represented as a dashed curve for reference.

As described above, the displacement Z calculated with the moving element Ai,j connected to the sensing bit lines $BSj_L$, $BSj_R$ and $BSj_P$ or any other lines is corrected with the offset value Z0 obtained with the moving element Ai,j disconnected from these lines. As a result, the unwanted effects of the offset due to the parasitic capacitance of the lines can be eliminated and the position sensing accuracy of the moving element Ai,j can be increased.

In the preferred embodiment described above, the displacements of the moving elements are sensed with those moving elements disconnected one after another. Alternatively, the displacements of those moving elements may be sensed simultaneously by providing a plurality of circuit sections, each including the voltage command section 130, D/A converters 131a, 131b and displacement sensing section 133. In particular, if three moving elements belonging to a single micromirror unit are driven simultaneously and their displacements are sensed and calibrated in the meantime, then the control operation can be carried out so as to compensate for even a crosstalk displacement that might happen when the driving force is transmitted among the moving elements. In that case, the conversion table to be made by the calibrating section 134 will output a voltage command value D1,1 for a moving element A1,1 on receiving an address including three pieces of information about the displacement (Z1,1) of the moving element A1,1, the displacement (Z1, 2) of another moving element A1,2 and the displacement (Z1,3) of still another moving element A1,3. If the voltage command value D1, 1 is affected by the displacements (Z1,2) and (Z1,3) to a relatively small degree, then the displacements (Z1,2) and (Z1,3) may have only their high-order bits.

Embodiment 5

Hereinafter, a fifth preferred embodiment of a microactuator according to the present invention will be described with reference to FIG. 12, which illustrates the schematic configuration of a microactuator according to this preferred embodiment.

The control section 75 of the microactuator of this preferred embodiment has the same configuration as the control section 75 of the microactuator of the third preferred embodiment described above. The microactuator of this preferred embodiment is different from the counterpart of the third preferred embodiment in the configurations of the moving section 160, switching section 161 and displacement sensing section 162. Hereinafter, these configurations will be described.

In this preferred embodiment, the line arrangements of the moving section 160 and switching section 161 for sensing the displacement are simplified. Each movable electrode $Y_{Li}$ of the moving section 160 is disconnected from the switching section 161 and grounded. Accordingly, each switch Si of the switching section 161 includes a switch connected to the fixed electrode $E_{Li}$ and a switch connected to the fixed electrode $E_{Ri}$ but no switch connected to the movable electrode $Y_{Li}$.

Figure 12:
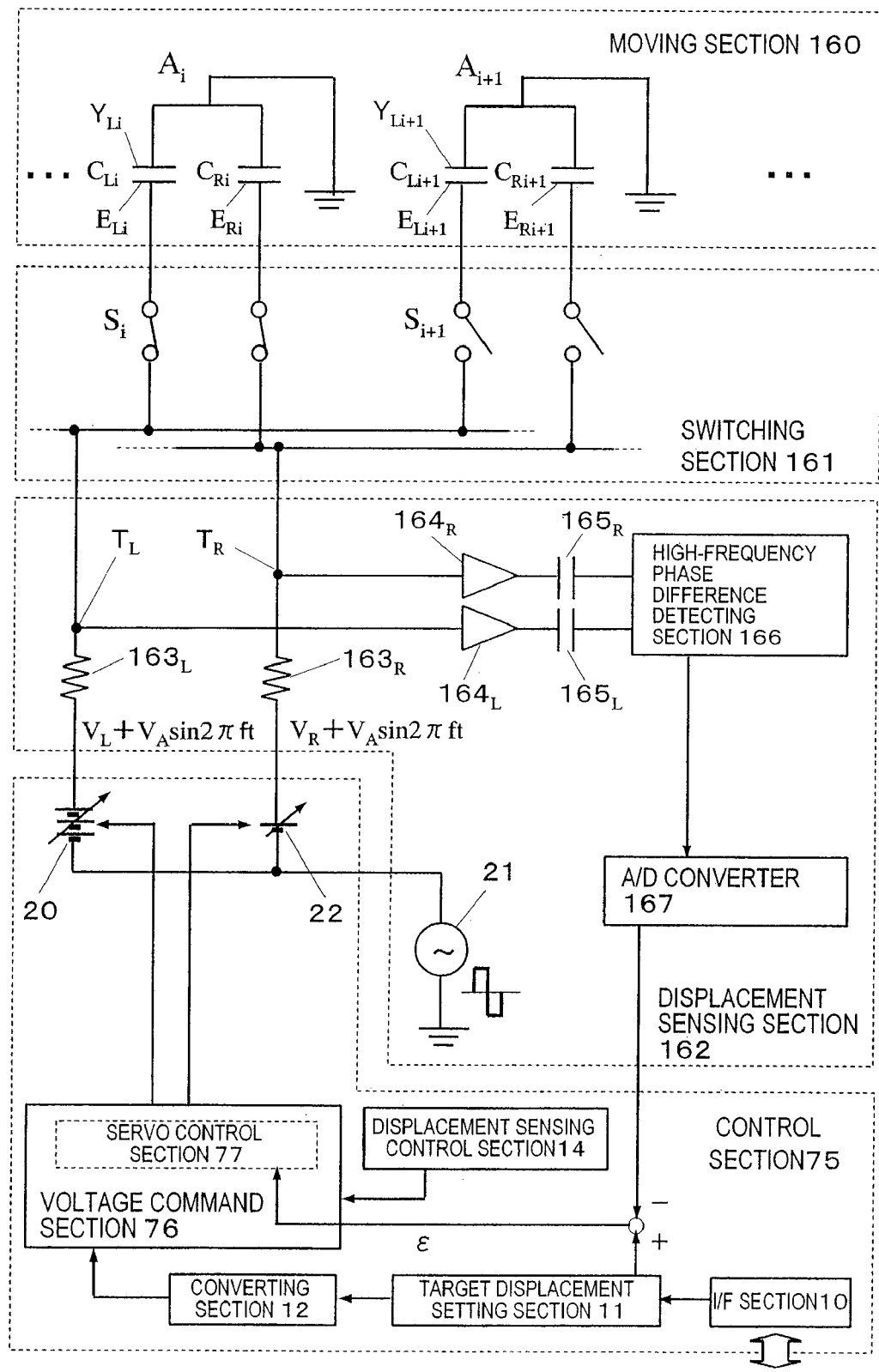
FIG. 12 illustrates the schematic configuration of a microactuator according to a fifth preferred embodiment of the present invention.

As shown in FIG. 12, the displacement sensing section 162 includes a high-frequency signal generating section 21, load resistors 163L and 163R, isolators 164L and 164R, high pass filters 165L and 165R, a high-frequency phase difference detecting section 166 and an A/D converter 167.

One terminal of the load resistor 163L will be referred to herein as a "first terminal $T_L$". The first terminal $T_L$ is connected to the fixed electrode $E_{Li}$ of the moving element Ai by way of the switch Si of the switching section 161. To the other terminal of the load resistor 163L, the sum signal $V_L+V_A \sin(2\pi ft)$ of the drive signal $V_L$ supplied from the first drive voltage generating section 20 and the high-frequency signal $V_A \sin(2\pi ft)$ supplied from the high-frequency signal generating section 21 is applied.

In the same way, one terminal of the load resistor 163R will be referred to herein as a "second terminal $T_R$". The second terminal $T_R$ is connected to the fixed electrode $E_{Ri}$ of the moving element Ai by way of the switch Si of the switching section 161. To the other terminal of the load resistor 163R, the sum signal $V_R+V_A \sin(2\pi ft)$ of the drive signal $V_R$ supplied from the second drive voltage generating section 22 and the high-frequency signal $V_A \sin(2\pi ft)$ supplied from the high-frequency signal generating section 21 is applied.

The load resistors 163L and 163R have the same impedance $Z_0$ with respect to the high-frequency signal $V_A$ sin (2πft). In this case, this impedance $Z_0$ is supposed to be pure resistance with no imaginary part and have a value including the internal resistance of the first and second drive voltage generating sections 20 and 22.

The magnitude of the impedance $Z_0$ is determined so as to satisfy $0.5 < 2\pi fCZ_0 < 2$, where is the electrostatic capacitance of the capacitors $C_{Li}$ and $C_{Ri}$ when the moving element Ai is not displaced. For example, if C is 10 fF, then f is set to 100 MHz and $Z_0$ is set to 160 kΩ. By defining the impedance $Z_0$ within such a range, the displacement sensitivity can be substantially maximized.

The isolators 164L and 164R are connected to the first and second terminals $T_L$ and $T_R$, respectively, to carry out impedance conversion. Each of these isolators 164L and 164R is implemented as a voltage follower using an operational amplifier. The outputs of the isolators 164L and 164R are input to the high-frequency phase difference detecting section 166 by way of the high pass filters 165L and 165R, respectively. The high pass filters 165L and 165R transmit sufficiently a high-frequency component having the frequency f and blocks sufficiently a low-frequency component of the drive signals $V_L$ and $V_R$.

The high-frequency phase difference detecting section 166 detects the phase difference between the incoming two high-frequency signals and outputs a signal representing the phase difference. The output of the high-frequency phase difference detecting section 166 is converted into digital data by the A/D converter 167. This digital data represents the difference between the capacitances of the capacitors $C_{Li}$ and $C_{Ri}$, i.e., the magnitude of displacement of the moving element Ai.

These isolators 164L, 164R, high pass filters 165L, 165R, high-frequency phase difference detecting section 166 and A/D converter 167 together function as a "high-frequency detecting section" in the microactuator of the present invention.

If the drive signals $V_L$ and $V_R$ supplied from the first and second drive voltage generating sections 20 and 22 have mutually different amplitude values in accordance with the instruction of the control section 75, then the moving element Ai is displaced. As a result, a difference is created between the capacitances of the capacitors $C_{Li}$ and $C_{Ri}$, which generates a phase difference with a high-frequency component having the frequency f between the first and second terminals $T_L$ and $T_R$ as described above. Accordingly, the displacement can be sensed without connecting each movable electrode $Y_{Li}$ to the displacement sensing section 162.

It should be noted that the drive signal has a frequency that is equal to or lower than the primary resonance frequency of the moving element Ai. The drive signal used in this preferred embodiment is a direct current voltage. Accordingly, in this preferred embodiment, the magnitude of the drive signal means a voltage value. The high frequency signal has a frequency that is equal to or higher than the primary resonance frequency of the moving element Ai.

In the microactuator of the preferred embodiment described above, the displacement sensing section 162 includes the high frequency signal generating section 21, the first load resistor 163L connected to the first electrode $E_{Li}$ at the first terminal $T_L$, the second load resistor 163R connected to the second electrode $E_{Ri}$ at the second terminal $T_R$, and the high frequency detecting section 164 through 167 connected to the first and second terminals $T_L$ and $T_R$. To the other terminal of the first load resistor 163L, a first sum signal $V_L + V_A \sin(2\pi ft)$, generated by superposing the high-frequency signal $V_A \sin(2\pi ft)$ on the first drive signal $V_L$, is applied. To the other terminal of the second load resistor 163R on the other hand, a second sum signal $V_R + V_A \sin(2\pi ft)$, generated by superposing the high-frequency signal $V_A \sin(2\pi ft)$ on the second drive signal $V_R$ having a different magnitude from the first drive signal $V_L$, is applied. And the high frequency detecting section 164 through 167 is designed so as to detect the phase difference of the high frequency signal between the first and second terminals $T_L$ and $T_R$. Thus, there is no need to connect the movable electrodes $Y_i$ to the displacement sensing section 162 one by one and the line arrangements of the moving section 160 and the switching section 161 can be simplified significantly.

In addition, according to the configuration of this preferred embodiment, just one high frequency signal generating section 21 needs to be provided and the second high frequency signal generating section 23 for inverting the phase may be omitted.

Furthermore, in the preferred embodiment described above, the load resistors 163L and 163R have fixed impedance. However, one of the load resistors 163L and 163R (e.g., the load resistor 163L) may have variable impedance. In that case, by adjusting the impedance of the load resistor 163L such that the frequency f of the differential voltage between the terminals $T_L$ and $T_R$ has zero component, the capacitance difference between the capacitors $C_{Li}$ and $C_{Ri}$ can be detected.

Also, in the preferred embodiment described above, the load resistors 163L and 163R are supposed to have pure resistance with no imaginary part. However, the present invention is in no way limited to that specific preferred embodiment. Alternatively, a coil, a capacitor and so on may be used either by themselves or in combination with a resistor such that the resistance value has an imaginary part. Particularly when a resonator circuit configuration is used, the phase sensitivity can be increased significantly.

In the microactuator of the present invention, the "load impedance element" does not have to be the "load resistor" of this preferred embodiment but may also be an element with a load impedance formed by the coil, capacitor and so on as described above.

The high frequency phase difference detecting section 166 for detecting the phase difference between the incoming two high frequency signals may be replaced with a configuration for detecting either the amplitude difference or amplitude ratio between the incoming two high frequency signals. In the microactuator of the present invention, the "high frequency detecting section" may have any arbitrary configuration for comparing the phases and/or amplitudes of the incoming two high frequency signals.

The difference between the circuit configuration of the displacement sensing section 162 of this preferred embodiment and that of an ordinary impedance bridging circuit will be described again supplementally. The circuit configuration of the displacement sensing section 162 is characterized by being symmetric with respect to only a high frequency signal and asymmetric with respect to a low frequency signal. That is to say, the first and second drive voltage generating sections 20 and 22, provided within the impedance bridging circuit, can generate mutually different drive voltages. By adopting such an asymmetric circuit configuration for a low frequency signal, the movable electrode of the moving element Ai can be displaced with the magnitude of its displacement sensed. On the other hand, the circuit configuration is symmetric with respect to a high frequency signal. Consequently, the very small capacitance difference between the capacitors $C_{Li}$ and $C_{Ri}$ can be detected precisely with the differential signal between the terminals $T_L$ and $T_R$.

Embodiment 6

Figure 13:
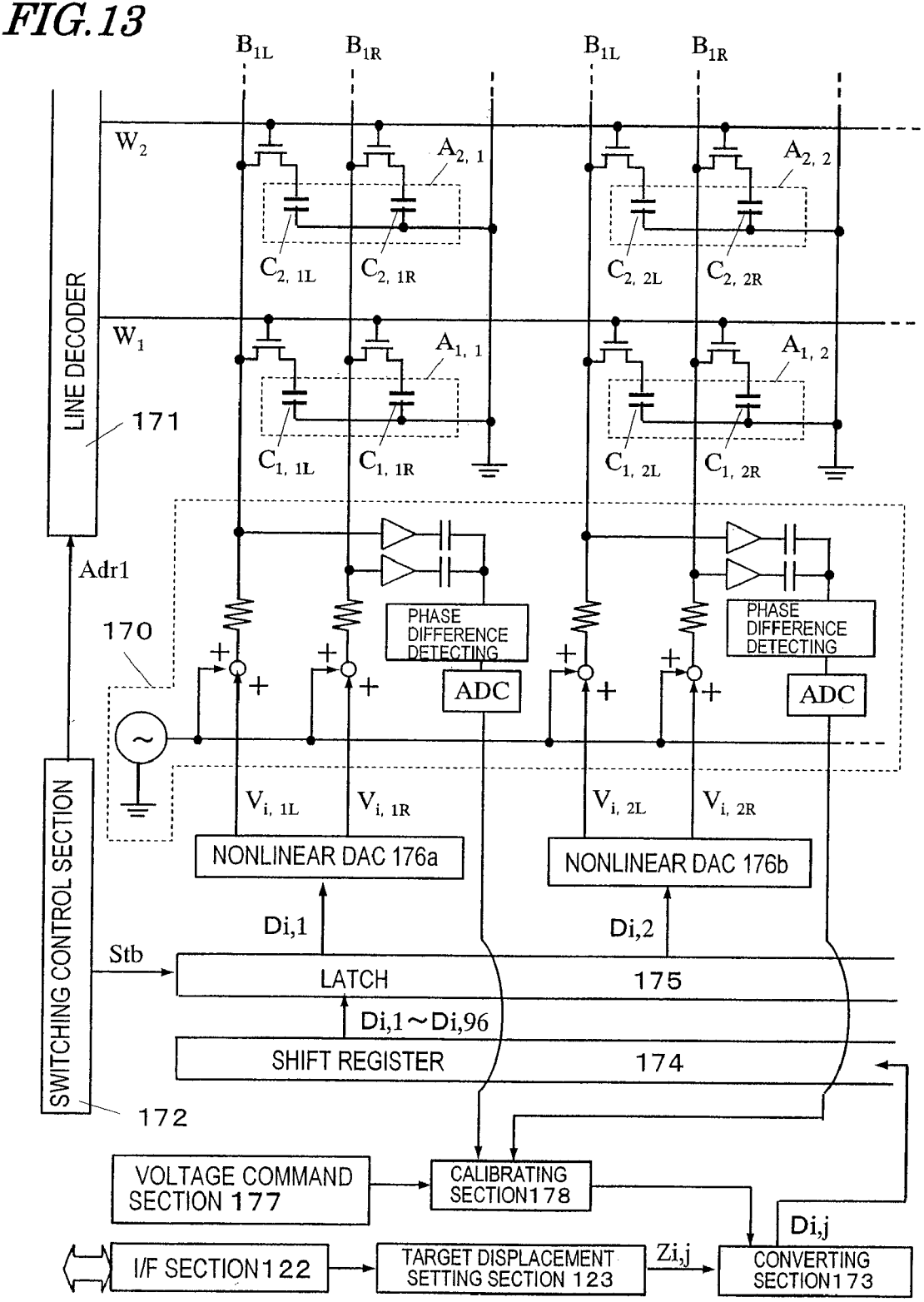
FIG. 13 illustrates the schematic configuration of a microactuator according to a sixth preferred embodiment of the present invention.

Hereinafter, a sixth preferred embodiment of a microactuator according to the present invention will be described with reference to FIGS. 13 and 14. FIG. 13 illustrates the schematic configuration of a microactuator according to this preferred embodiment.

In the microactuator of this preferred embodiment, each of the moving element Ai,j, I/F section 122 and target displacement setting section 123 has the same configuration as the counterpart of the microactuator of the fourth preferred embodiment described above. Also, the displacement sensing section 170 is obtained by arranging a plurality of displacement sensing sections 162 of the microactuator of the fifth preferred embodiment.

The configuration of this preferred embodiment is different from that of the fourth or fifth preferred embodiment described above in that a nonlinear D/A converter 176 is used to convert a voltage command value Di,j into drive voltages $V_{i,jL}$ and $V_{i,jR}$, thereby compensating for the non-linearity of the relationship between the drive voltages $V_{i,jL}$ and $V_{i,jR}$ and the displacement of the moving element and establishing a substantially linear relationship between the voltage command value Di,j and the displacement of the moving element. As a result, the number of bits of the voltage command value Di,j to achieve a required displacement resolution can be reduced. In addition, the computational complexity can be reduced significantly as well when the calibrating section 178 fits the correlation between the voltage command value Di,j and the moving element to an approximation function.

Two switching MOS transistors are connected to each moving element Ai,j. When a word line Wi is turned into H level, its associated bit lines BjL and BjR become electrically continuous with the first and second electrodes of its associated moving element Ai,j.

The word lines W1 to W32 are connected to a line decoder 171 and only one of the word lines that has been selected in response to an address signal Adr1 from a switching control section 172 is turned into H level.

A converting section 173, a shift register 174 and a latch 175 work in quite the same way as the converting section 124, shift register 125 and latch 126 of the fourth preferred embodiment described above except that the number of bits of the voltage command value Di,j to process is nine. Specifically, the converting section 124, shift register 125 and latch 126 process a voltage command value of 11 bits. Thus, the configuration of this preferred embodiment is rougher than that of the fourth preferred embodiment by 2 bits. However, a substantially linear relationship is established between the voltage command value Di,j and the displacement of the moving element by using the D/A converter 176 as will be described later. For that reason, similar resolution is realized for the displacement of the moving element. Also, as described for the fourth preferred embodiment, the most significant bit of the 9-bit voltage command value Di,j represents whether the fixed electrode to drive is the first electrode of the moving element Ai,j or the second electrode thereof. The shift register 174 has a transfer rate of 13.8 MHz and transfers 96 data items, each consisting of 9 bits, in 62.5 μs.

The voltage command values Di,1 through Di,96 held in the latch 175 are converted by 96 nonlinear D/A converters 176 into drive voltages $V_{i,jL}$ and $V_{i,jR}$ to be applied to the respective fixed electrodes of each moving element Ai,j. Each nonlinear D/A converter 176 outputs a drive voltage, corresponding to the lower eight bits of its associated voltage command value Di,j, to one of its associated bit lines $B_{jL}$ and $B_{jR}$ that has been selected according to the most significant bit of the voltage command value Di,j. A predetermined nonlinear correlation is established between the value of these lower eight bits and the magnitude of the drive voltage. This nonlinear correlation is defined so as to compensate for the non-linearity of the relationship between the drive voltage and the displacement of the moving element and establish a linear relationship between the voltage command value Di,j and the displacement of the moving element. These nonlinear D/A converters 176 will be described more fully later.

When the line decoder 171 turns only an $i^{th}$ word line Wi into H level, the respective moving elements Ai,j become electrically continuous with their associated bit lines $B_{iL}$ and $B_{iR}$ and the displacements of the respective moving elements Ai,j are subjected to an open loop control in accordance with the voltage command values Di,j.

In performing the calibrating operation, the displacement sensing section 170 senses the displacement while changing this voltage command value Di,j in multiple stages. The output of the displacement sensing section 170 is supplied to a calibrating section 178, which compiles a correction table by associating the output with a voltage command value Di,j. This operation is basically the same as that described for the fourth preferred embodiment as well as the offset correction. The difference between this and fourth preferred embodiments lies in that a linear function $D(Z)=\alpha Z+\beta$ is used during the fitting operation with the approximation function.

Hereinafter, the configuration of the nonlinear D/A converter 176 and the linear function approximating operation of the calibrating section 178 will be described with reference to FIG. 14.

FIG. 14(a) schematically illustrates the configuration of the nonlinear D/A converter 176. The configuration of a single nonlinear D/A converter 176a will be described herein as an example but the other 95 converters have the same configuration. It should be noted that the subscripts i, j, representing with which moving element a given voltage command value is associated as in Di,j, are omitted for the sake of simplicity. Thus, every voltage command value will be identified by D, every pair of drive voltages output to the first and second electrodes by $V_L$ and $V_R$, and every pair of bit lines by $B_L$ and $B_R$, respectively.

Supposing the potential levels at both terminals of a serial connection of resistors RI through Rn−1 are the lowest potential V1 and the highest potential Vn, respectively, the nonlinear D/A converter 176a generates a number n of potentials V1 through Vn including intermediate potentials resulting from resistor voltage division. And a selector 180 selectively outputs an appropriate one of these n potentials V1 through Vn. In this example, the lowest potential V1 is supposed to be ground potential. Also, since the nonlinear D/A converter 176a has a bit precision of 8 bits, the n value is 256 in this example.

Receiving the 9-bit voltage command value D, the selector 180 outputs its associated drive voltages $V_L$ and $V_R$ to the bit lines $B_L$ and $B_R$, respectively. If the most significant bit of the voltage command value D is zero, then the lowest potential V1 is selected as the drive voltage $V_L$ and one of the potentials V1 through Vn, corresponding to the lower eight bits of the voltage command value D, is selected as the drive voltage $V_R$. On the other hand, if the most significant bit is one, then one of the potentials V1 through Vn, corresponding to the lower eight bits of the voltage command value D, is selected as the drive voltage $V_L$ and the lowest potential V1 is selected as the drive voltage $V_R$. In the following description, the sign of the voltage command value D is supposed to be positive when the most significant bit thereof is zero and negative when the most significant bit thereof is one. Also, the drive voltage V is defined as $V=V_R-V_L$ and given the positive or negative sign just like the voltage command value D.

The resistance values of the resistors R1 through Rn−1 are defined so as to include at least two mutually different ones. By setting these resistance values appropriately, arbitrary non-linearity is achieved. More specifically, if the resistor, located closest to the terminal to which the lowest potential V1 is connected, is identified by Ri and the other resistors are sequentially identified by R2, R3, . . . and Rn−1, respectively, their resistance values are defined so as to decrease in the descending order (i.e., R1>R2>R3> . . . >R−1). By adopting such settings, the greater the potential value Vi (where i=2 through n), the smaller the potential increase Vi−Vi−1. That is to say, the greater the absolute value of the drive voltage V, the smaller the increase in drive voltage V with respect to the increase in voltage command value D.

The drive voltage V and the displacement Z of the moving element satisfy such a relationship that the greater the absolute value of the drive voltage V, the greater the increase in displacement Z with respect to the increase in the drive voltage V. Thus, by giving the D/A converter 176 the nonlinear characteristic described above, the nonlinear characteristic between the drive voltage V of the moving element and the displacement Z can be compensated for and the relationship between the voltage command value D and the displacement Z of the moving element can be made closer to a linear one.

More preferably, the resistance values of the resistors R1 through Rn are defined such that the function V(D) of the voltage command value D and the drive voltage V satisfy the equation $|V|=k \cdot |D|^{1/2}$ (where k is a constant).

FIG. 14(*b*) is a set of graphs showing correlations between the voltage command value D and the displacement Z in the calibrating section 178.

Specifically, the graph (A) on the upper right side of FIG. 14(*b*) shows a function V(D) representing the characteristic between the voltage command value D and the drive voltage V of the nonlinear D/A converter 176. As described above, this function is defined so as to satisfy the equation $|V|=k \cdot |D|^{1/2}$. More exactly, the nonlinear relationship is defined so as to satisfy $V=k \cdot D^{1/2}$ if the voltage command value D is positive and $V=-k\square(-D)^{1/2}$ if the voltage command value D is negative, respectively. This characteristic is determined by the resistors R1 through Rn−1 of the nonlinear D/A converter 176, and therefore, is fixed and not modifiable by any external operation.

The graph (B) on the upper left side of FIG. 14(*b*) shows a function Z1(V) representing the characteristic between the drive voltage V and the displacement Z of a moving element A1 as a solid curve and a function Z2(V) representing the characteristic between the drive voltage V and the displacement Z of another moving element A2 as a dashed curve, respectively. The differences between these moving elements A1 and A2 include not only a variation in characteristic among the respective moving elements but also a variation in the characteristic of the same moving element with time or according to the environment, for example. This graph shows only two different characteristic functions. Actually, however, there are more characteristic functions. This characteristic is determined by the specific state of the moving element, and therefore, is fixed and not modifiable by any external operation, either.

The graph (C) on the lower left side of FIG. 14(*b*) shows the calibrating functions D1(Z) and D2(Z) defined by the calibrating section 178 to calibrate the characteristics of these moving elements A1 and A2. More specifically, the calibrating function D1(Z) represents the relationship between the displacement Z and the voltage command value D of the moving element A1 by a solid line. On the other hand, the calibrating function D2(Z) represents the relationship between the displacement Z and the voltage command value D of the moving element A2 by a dashed line. These calibrating functions D1(Z) and D2(Z) can be updated arbitrarily through a calibrating operation.

Hereinafter, it will be described how the displacements Z are sensed with the voltage command value D changed in multiple stages until the calibrating function D(Z) is defined based on the results.

First, as schematically indicated by the five open circles on the graph (A) of FIG. 14(*b*), voltage command values D are selected in five stages. Then, drive voltages V are output in five stages in accordance with the characteristic function V(D) of the nonlinear D/A converter 176.

Next, on the graph (B) shown in FIG. 14(*b*), as for the moving element A1, five displacements Z are plotted as indicated by the five open circles on the characteristic function Z1(V) with respect to these drive voltages V. Likewise, as for the moving element A2, five displacements Z are plotted as indicated by the five open triangles on the characteristic function Z2(V). And the magnitudes of these displacements Z are sensed by the displacement sensing section 170.

Next, on the graph (C) shown in FIG. 14(*b*), the relationship between the displacement Z and the voltage command value D as detected by the displacement sensing section 170 is fitted with the calibrating function D(Z).

The nonlinear characteristics Z1(V) and Z2(V) of the moving elements are compensated for with the nonlinear characteristic V(D) of the nonlinear D/A converter 176. That is why the calibrating functions D1(Z) and D2(Z) are substantially linear and the fitting operation can be carried out using a linear function as an approximation function. Accordingly, not just can the order of the approximation function be decreased but also isn't there any need to apply the approximation function to respective quadrants according to the signs of the voltage command value D and displacement Z. As a result, the approximation function can be handled synthetically over all quadrants and the fitting computations can be simplified significantly.

Also, if the linear function is used as an approximation function, then the voltage command value D can be directly represented as the function D(Z) of the displacement Z without decreasing the precision particularly significantly. This function notation D(Z) can be adapted more suitably to the converting section 173, which needs to convert the target displacement Z into the voltage command value D, than its inverse function notation Z(D). As a result, various conversion-related operations, including drawing up a conversion table, can be carried out more easily.

It is not always mathematically evident that both of these calibrating functions D1(Z) and D2(Z) exhibit quasi-linear characteristics. One reason why these functions can be made linear with precision is that the characteristic functions Z1(V) and Z2(V) of the moving elements do not change in arbitrary curves but with a certain tendency. More specifically, Z1(V) tends to be approximately equal to the product of Z2(V) and a predetermined constant. This is because the characteristic function Z(V) of the moving element changes mainly due to the variation in the spring constant of the hinge 106 of the moving element. In this manner, in a system in which the hinge 106 of the moving element has linear restoring force and in which the magnitude of displacement is determined by the balance between the driving force and the restoring force, the nonlinear characteristic between the driving force and the displacement is compensated for by providing non-linearity for the nonlinear D/A converter 176. Accordingly, the precision of linearity of the characteristic between the target displacement Z and the voltage command value D can be increased and the calibrating function D(Z) can be calculated highly accurately through simple computations.

The microactuator of this preferred embodiment includes a nonlinear D/A converter 176 for converting a voltage command value D into a drive voltage V nonlinearly such that the greater the value of the drive voltage V, the smaller the increase of the drive voltage V with the increase of the voltage command value D. Thus, the non-linearity of the characteristic between the drive voltage V and the displacement Z of the moving element can be compensated for and the relationship between the voltage command value D and the displacement Z of the moving element can be made substantially linear. As a result, the number of bits of the voltage command value D to achieve required displacement resolution can be reduced and the overall circuit size and data transfer rate can be reduced as well.

In addition, the calibrating section 178 approximates the correlation between the voltage command value D and the displacement Z of the moving element with the calibrating function D(Z), which is a linear function. Thus, there is no need to apply the approximation function to respective quadrants anymore according to the signs of the voltage command value D and displacement Z. As a result, the approximation function can be handled synthetically over all quadrants. On top of that, the voltage command value D can be directly represented as the function D(Z) of the displacement Z. Consequently, the load of the calibrating computations can be reduced significantly.

As described above, according to the present invention, while a moving element is displaced in response to a drive signal supplied from the driving section, the displacement sensing section senses the displacement and the calibrating section calibrates the correlation between the displacement and the drive signal. Thus, the displacement of each moving element can be sensed very easily without using any external displacement measuring device. And the variation in the characteristic of the moving element either with time or according to the environment (such as the temperature) can be coped with.

In addition, the switching section selectively connects the driving section and/or the displacement sensing section to one of the moving elements after another. Accordingly, even if the microactuator includes a plurality of moving elements, the size of the displacement sensing circuit can be reduced and the chip cost can be cut down.

Furthermore, by applying a microactuator with such a self displacement sensing function to a deformable mirror, optical control can be carried out with a simple configuration, with sufficient reliability maintained with respect to the variation with time or the environment, and with the loss of light quantity minimized.

A microactuator according to the present invention is applicable for use in not just deformable mirrors but also various other types of equipment including radio frequency circuits such as relay switches and tunable capacitors and fluid-related devices such as micro-pumps.

We claim:

1. A microactuator comprising:
a substrate;
a plurality of moving elements, which are supported on the substrate in a displaceable position;
a driving section for outputting a drive signal that causes displacement in the moving elements;
a displacement sensing section for sensing the displacement of the moving elements; and
a switching section for selectively connecting the driving section and/or the displacement sensing section to one of the moving elements after another,
wherein the switching section senses the displacement of each said moving element while switching time-sequentially objects of the displacement sensing by the displacement sensing section.

2. The microactuator of claim 1, comprising a closed loop control section for performing a closed loop control on the output of the driving section with the output of the displacement sensing section.

3. The microactuator of claim 2, further comprising an open loop control section for performing an open loop control on the output of the driving section, wherein the microactuator controls the moving elements by switching the closed loop control section and the open loop control section time-sequentially.

4. The microactuator of claim 3, wherein the open loop control section includes a holding section for holding the output of the driving section that is under the control of the closed loop control section.

5. The microactuator of claim 2, wherein the moving elements are provided so as to store charges in accordance with the drive signal, and wherein the switching section switches the moving elements between a first state, in which the moving elements are connected to the closed loop control section, and a second state, in which the moving elements have impedance that is high enough to store the charges.

6. The microactuator of claim 2, comprising a counter for calculating a value representing the amount of time in which each said moving element is connected to the closed loop control section and a convergence detecting section for detecting the convergence of the closed loop control,
wherein unless the convergence detecting section detects the convergence even when the output of the counter exceeds a predetermined upper limit, the switching section disconnects the moving element from the closed loop control section.

7. The microactuator of claim 6, wherein the value representing the amount of time in which the moving element is connected to the closed loop control section is the number of times that the closed loop control section performs its loop repeatedly.

8. The microactuator of claim 6, wherein if the output of the counter is less than the upper limit when the switching section switches the connection of the closed loop control section to the next moving element upon the detection of the convergence by the convergence detecting section, the upper limit of the next moving element is changed according to the output of the counter.

9. The microactuator of claim 1, wherein the switching section connects at least two of the moving elements to the displacement sensing section simultaneously.

* * * * *

UNITED STATES PATENT AND TRADEMARK OFFICE
CERTIFICATE OF CORRECTION

| | | |
|---|---|---|
| PATENT NO. | : 7,635,939 B2 | Page 1 of 1 |
| APPLICATION NO. | : 12/050478 | |
| DATED | : December 22, 2009 | |
| INVENTOR(S) | : Yoshihiro Mushika et al. | |

It is certified that error appears in the above-identified patent and that said Letters Patent is hereby corrected as shown below:

Title page, Section (30):

The date for JP 2002-322247 should read -- Nov. 6, 2002 --;

Page 2, under "Other Publication":

Line 4 under "Other Publication", "High-Brigtness" should read -- High-Brightness --;
Line 9 under "Other Publication", "Devcies" should read -- Devices --.

Signed and Sealed this

Twentieth Day of April, 2010

David J. Kappos
*Director of the United States Patent and Trademark Office*